(12) United States Patent
Benton, Jr. et al.

(10) Patent No.: US 10,871,244 B1
(45) Date of Patent: *Dec. 22, 2020

(54) CRYOGENIC TRENCH/TROUGH APPARATUS AND METHOD

(71) Applicant: WASKEY BRIDGES, INC., Baton Rouge, LA (US)

(72) Inventors: Stephen G. Benton, Jr., Metairie, LA (US); Benjamin Owens, Baton Rouge, LA (US); Charlie Belsom, Covington, LA (US); Kevin Babin, Baton Rouge, LA (US); Jon Gary, Baton Rouge, LA (US)

(73) Assignee: WASKEY BRIDGES, INC., Baton Rouge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/662,578

(22) Filed: Oct. 24, 2019

Related U.S. Application Data

(63) Continuation of application No. 16/156,844, filed on Oct. 10, 2018, now Pat. No. 10,495,235.

(Continued)

(51) Int. Cl.
*E03F 5/04* (2006.01)
*E02B 5/02* (2006.01)
*F16L 1/036* (2006.01)

(52) U.S. Cl.
CPC ............... *F16L 1/036* (2013.01); *E02B 5/02* (2013.01); *E03F 5/0407* (2013.01)

(58) Field of Classification Search
CPC ......... E03F 5/04; E03F 5/0401; E03F 5/0407; E03F 5/14; E03F 3/046; E02B 5/02; F16L 1/036

(Continued)

(56) References Cited

U.S. PATENT DOCUMENTS 4,689,358 A * 8/1987 Schorr .................... C04B 26/14
523/209
4,940,359 A 7/1990 Van Duyn et al.
(Continued)

FOREIGN PATENT DOCUMENTS

WO WO2012073123 6/2012

OTHER PUBLICATIONS

ChemCo Systems CCS InsulPOX PowerPoint Presentation found at: https://www.slideshare.net/jbors/chemco-systems-insulpox-cryogenic-insulating-polymer-concrete-ipc-overlay-91977859.
(Continued)

*Primary Examiner* — Frederick L Lagman
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

A method of installing a trench for containing a cryogenic spill, including the step of constructing multiple precast concrete sections at a first location, each section preferably having a bottom wall and spaced apart side walls connected to and extending up from the bottom wall. Each section preferably has end portions that enable connection to another said concrete section. The method includes (at the first location) preparing multiple panels of polymeric concrete material by filling one or more molds with a slurry or liquid polymeric concrete material and after time allowing the material to cure and harden. The mold can have a cavity that is lined with a release material. At the first location, one or more of the panels can be adhered to the bottom wall and side walls of each concrete section preferably using an adhesive. After adhering of the panels to the concrete sections, the concrete sections can be transported from the first location to a second location that is remote from the first location. At the second location, the concrete sections are connected together using connections that preferably join one end portion of a concrete section to and end portion of (Continued)

another concrete section. An epoxy grout is preferably field applied to the connections at the second location.

19 Claims, 27 Drawing Sheets

Related U.S. Application Data

(60) Provisional application No. 62/599,905, filed on Dec. 18, 2017, provisional application No. 62/580,943, filed on Nov. 2, 2017, provisional application No. 62/570,369, filed on Oct. 10, 2017.

(58) Field of Classification Search
USPC .............................................. 405/118; 404/2
See application file for complete search history.

(56) References Cited

U.S. PATENT DOCUMENTS

| | | | |
|---|---|---|---|
| 5,213,438 A | 5/1993 | Barenwald | |
| 5,305,568 A * | 4/1994 | Beckerman | B32B 3/00 52/309.4 |
| 5,568,995 A | 10/1996 | Beamer | |
| 5,573,351 A | 11/1996 | Beamer | |
| 5,613,804 A | 3/1997 | Beamer | |
| 5,709,739 A | 1/1998 | Wittich et al. | |
| 8,545,611 B2 | 10/2013 | Davies et al. | |
| 10,487,510 B1 | 11/2019 | Benton, Jr. et al. | |
| 10,495,235 B1 | 12/2019 | Benton, Jr. et al. | |
| 2006/0280558 A1 | 12/2006 | Hankinson | |
| 2011/0110719 A1 | 5/2011 | Simon | |
| 2014/0305856 A1* | 10/2014 | Deskins | C05F 7/00 210/175 |
| 2019/0242526 A1* | 8/2019 | Subotsch | B32B 5/024 |

OTHER PUBLICATIONS

Chem Co Systems Concrete Repair Posts, found at : http://info.chemcosystems.com/blog/-insulating-polymer-overlay-for-cryogenic-Ing-terminal-spills.

Thiokol 415 Technical Data Sheet, found at: http://lakeamandapoa.org/assets/Product_data_sheets_for_Misc_Specs.pdf.

* cited by examiner

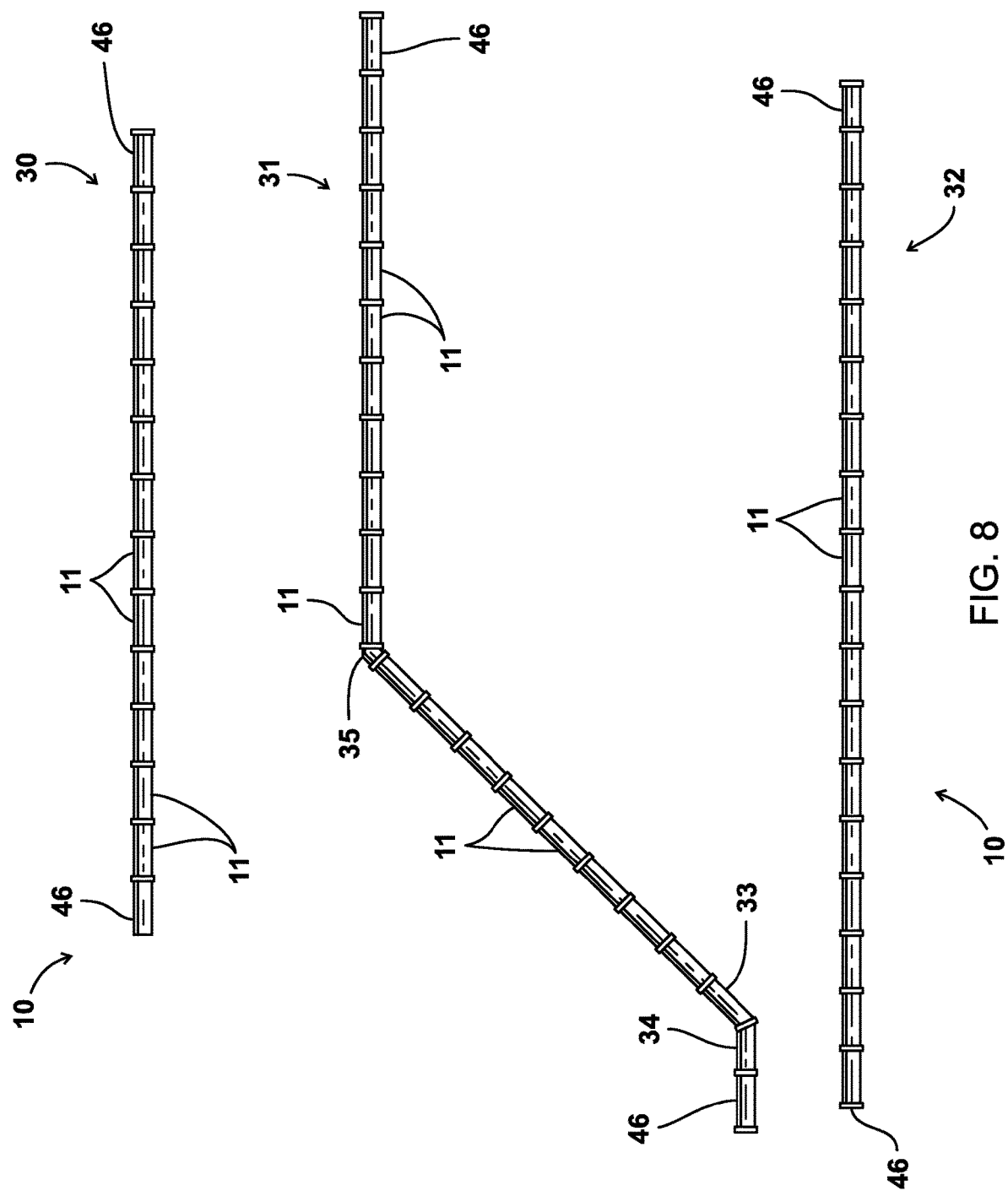

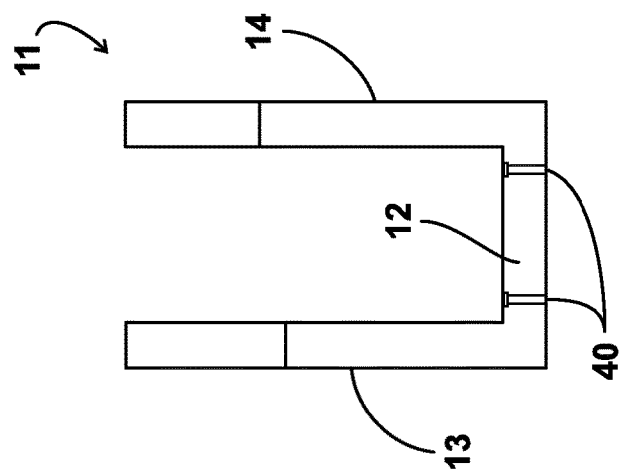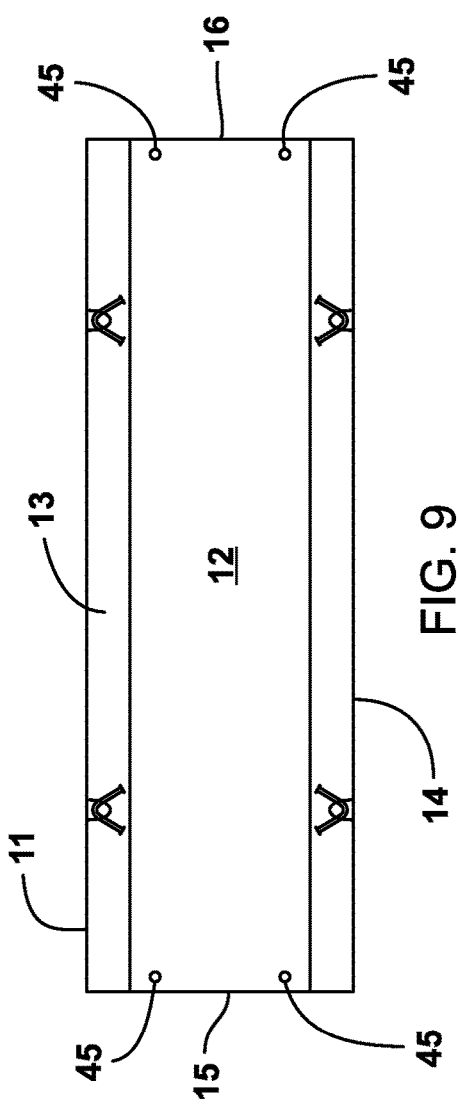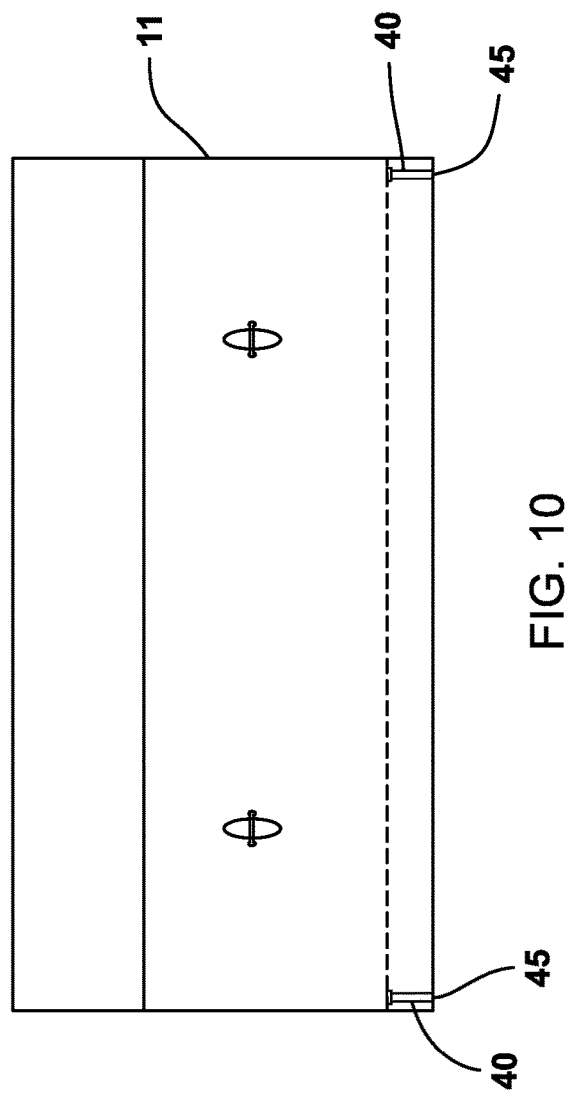

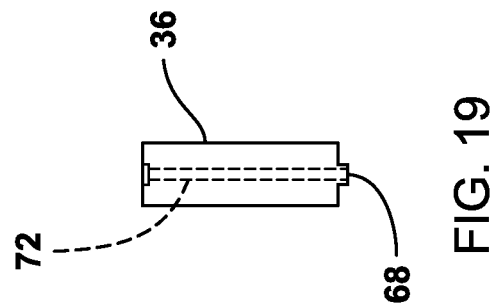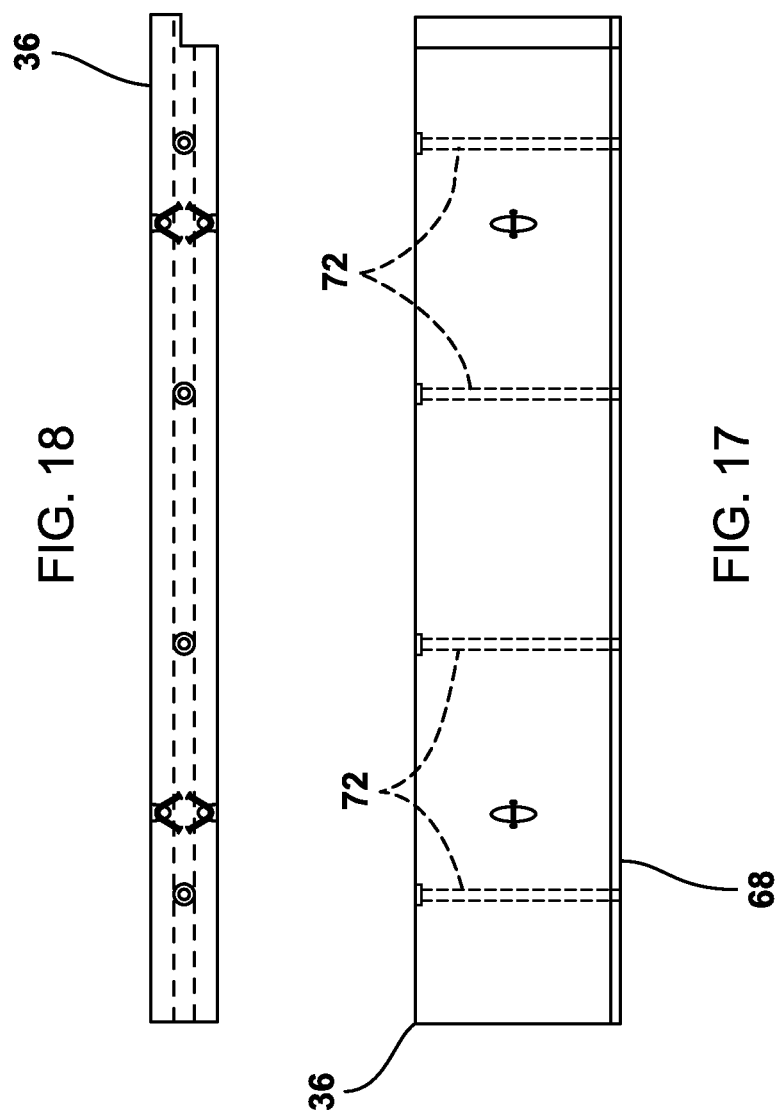

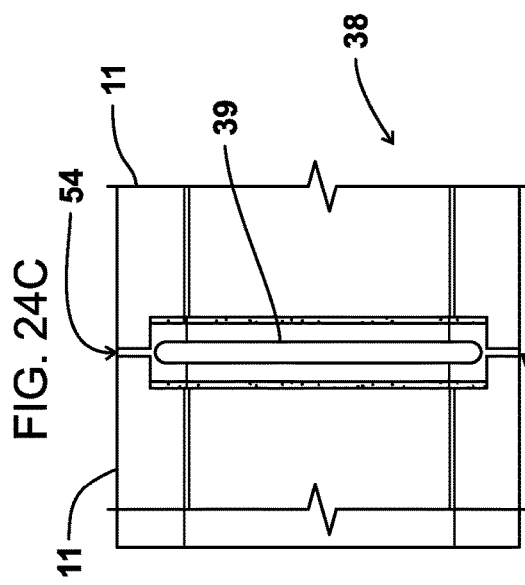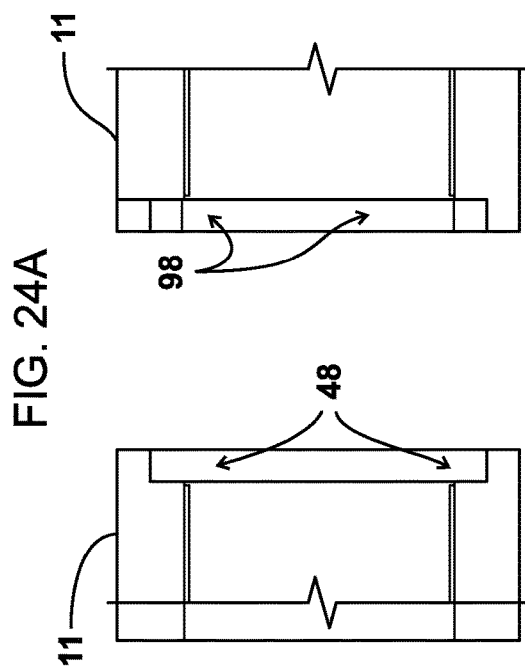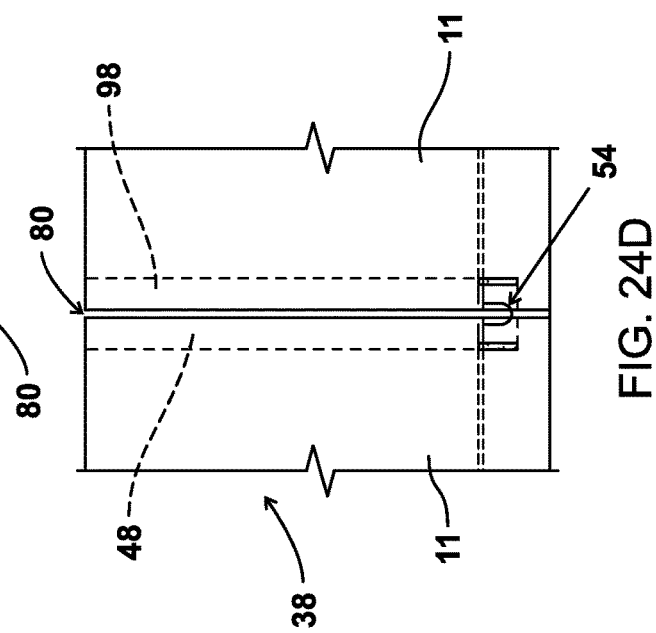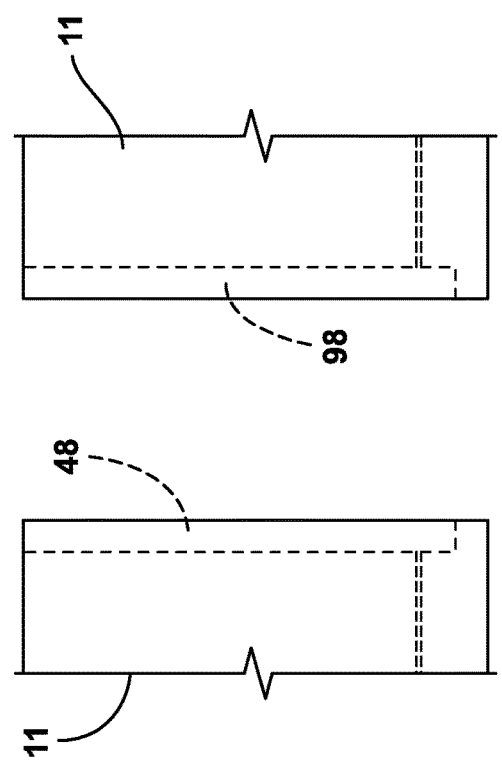

CRYOGENIC TRENCH/TROUGH APPARATUS AND METHOD

CROSS-REFERENCE TO RELATED APPLICATIONS

This application is a continuation of U.S. patent application Ser. No. 16/156,844, filed 10 Oct. 2018 (issued as U.S. Pat. No. 10,495,235 on 3 Dec. 2019), which claims benefit of U.S. Provisional Patent Application Ser. No. 62/570,369, filed 10 Oct. 2017; U.S. Provisional Patent Application Ser. No. 62/580,943, filed 2 Nov. 2017; and U.S. Provisional Patent Application Ser. No. 62/599,905, filed 18 Dec. 2017, each of which is hereby incorporated herein by reference.

Priority of U.S. Provisional Patent Application Ser. No. 62/570,369, filed 10 Oct. 2017; U.S. Provisional Patent Application Ser. No. 62/580,943, filed 2 Nov. 2017; and U.S. Provisional Patent Application Ser. No. 62/599,905, filed 18 Dec. 2017, each of which is incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a method and apparatus for construction of a cryogenic trench that features concrete precast sections that are fitted with cast panels, transported to a job site and assembled with special connections.

2. General Background of the Invention

Liquified natural gas (LNG) can include methane and ethane. When the gas is cooled to approximately –260 degrees Fahrenheit, it can be transported in a liquid state. In a liquid state, LNG takes up 1/600th of the space compared to a gaseous phase, making it much easier to ship and store when pipeline transport is not feasible. The present invention provides a method and apparatus for construction and installation of precast troughs or trenches that are preferably lined with panels that are capable of handling spillage of cryogenic material such as liquified natural gas or LNG.

The following are hereby incorporated herein by reference:

ChemCo Systems CCS InsulPOX™ PowerPoint Presentation found at: https://www.slideshare.net/jbors/chemco-systems-insulpox-cryogenic-insulating-polymer-concrete-ipc-overlay-91977859;

ChemCo Systems Concrete Repair Posts, found at: http://info.chemcosystems.com/blog/-insulating-polymer-overlay-for-cryogenic-lng-terminal-spills;

Thiokol 415 Technical Data Sheet, found at: http://lakeamandapoa.org/assets/Product_data_sheets_for_Misc_Specs.pdf.

BRIEF SUMMARY OF THE INVENTION

The present invention includes a method of installing a trench for containing a cryogenic spill. The method includes the steps of constructing multiple precast concrete sections, each section preferably having a bottom wall and spaced apart side walls connected to and extending up from the bottom wall. Each section can have end portions that preferably enable connection to another concrete section. At the first location, multiple panels of polymeric concrete material can be prepared by filling one or more molds with a slurry or liquid polymeric concrete material and after time allowing the material to cure and harden. The mold can have a cavity that is preferably lined with a release material. At the first location, one or more of the panels can be adhered to the bottom wall and side walls of each concrete section preferably using an adhesive. The concrete sections can be transported from the first location to a second location. At the second location, the concrete sections can be connected together using connections of one end portion to another end portion. An epoxy grout can be added to the connections at the second location.

In one embodiment, each panel can have an upper surface and a lower surface and further comprising applying the adhesive to the upper surface.

In one embodiment, the lard can be removed from the lower surface of each panel.

In one embodiment, each panel can be between about one half and three inches thick.

In one embodiment, each panel can have a generally rectangular periphery.

In one embodiment, the liquid polymeric concrete material can be a cryogenic insulating material.

In one embodiment, the release material preferably includes animal fat.

In one embodiment, the release material preferably includes lard.

In one embodiment, at least one of the side walls can have a side wall height and wherein the panels preferably extend vertically only part of the side wall height.

In one embodiment, the precast concrete sections can have openings through the bottom wall at one or both of the end portions.

The present invention includes a method of installing a trench for containing a cryogenic spill. The method includes the steps of constructing multiple precast concrete sections, each section preferably having a bottom wall and spaced apart side walls connected to and extending up from the bottom wall. Each section can have end portions that enable connection to another concrete section. At the first location, multiple panels of polymeric concrete material can be prepared by filling one or more molds with a slurry or liquid polymeric concrete material and after time allowing the material to cure and harden. The mold can have a cavity that can be lined with a release material. At the first location, one or more of the panels can be adhered to the bottom wall and side walls of each concrete section preferably using an adhesive. The concrete sections can be transported from the first location to a second location. At the second location, the concrete sections can be connected together using connections of one end portion to another end portion. An epoxy grout can be applied to the connections at the second location. The connection preferably includes spacing the end portions apart to form a gap and preferably filling the gap with a seal.

In one embodiment, the seal preferably includes a bellow structure.

The present invention includes a method of installing a trench for containing a cryogenic spill. The method includes constructing multiple precast concrete sections, each section preferably having a bottom wall and spaced apart side walls connected to and extending up from the bottom wall. Each section can have end portions that enable connection to another concrete section. At the first location, multiple panels can be prepared of polymeric concrete material by preferably filling one or more molds with a slurry or liquid polymeric concrete material and after time preferably allowing the material to cure and harden. At the first location, preferably adhering one or more of the panels to the bottom wall and side walls of each concrete section preferably using an adhesive. Preferably transporting the concrete sections from the first location to a second location. At the second location, preferably connecting the concrete sections together using connections of one end portion to another end portion. Preferably applying a non-sag filler to the connections at the second location.

In one embodiment, anchor bolts preferably extend through the openings into a foundation.

In one embodiment, the foundation can be concrete.

In one embodiment, the present invention preferably includes precast concrete.

In one embodiment, the panels are preferably adhered in a vertical position.

In one embodiment, the panels are preferably adhered in a horizontal position.

In one embodiment, the panels are preferably made of insulating polymer concrete material that can be self-leveling.

In one embodiment, the seal preferably includes a non-sag sealing material.

In one embodiment, the sealing material can be applied in a vertical application.

In one embodiment, the sealing material can be applied in a horizontal application.

In one embodiment, the panels and the sealing material preferably create continuous cryogenic protection between the concrete sections.

In one embodiment, the seal preferably is an expansion joint.

In one embodiment, the expansion joint seal is preferably a stainless steel bellow.

In one embodiment, the precast concrete sections preferably have openings through the bottom wall at one or both of the end portions.

In one embodiment, the seal can include a butyl rubber elastomer.

In one embodiment, the seal can include an engineering cloth.

In one embodiment, the seal can include one or more layers of the butyl rubber elastomer and the engineering cloth.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 8 is a schematic diagram of a preferred embodiment of the apparatus of the present invention;

FIGS. 9-11 are diagrams of a straight trough portion of a preferred embodiment of the apparatus of the present invention;

FIGS. 17-19 are top, side and end views of the trough riser portion of a preferred embodiment of the apparatus of the present invention;

FIGS. 24A-24D are schematic diagrams of a trough expansion joint detail before and after assembly;

DETAILED DESCRIPTION OF THE INVENTION

Figure 12:
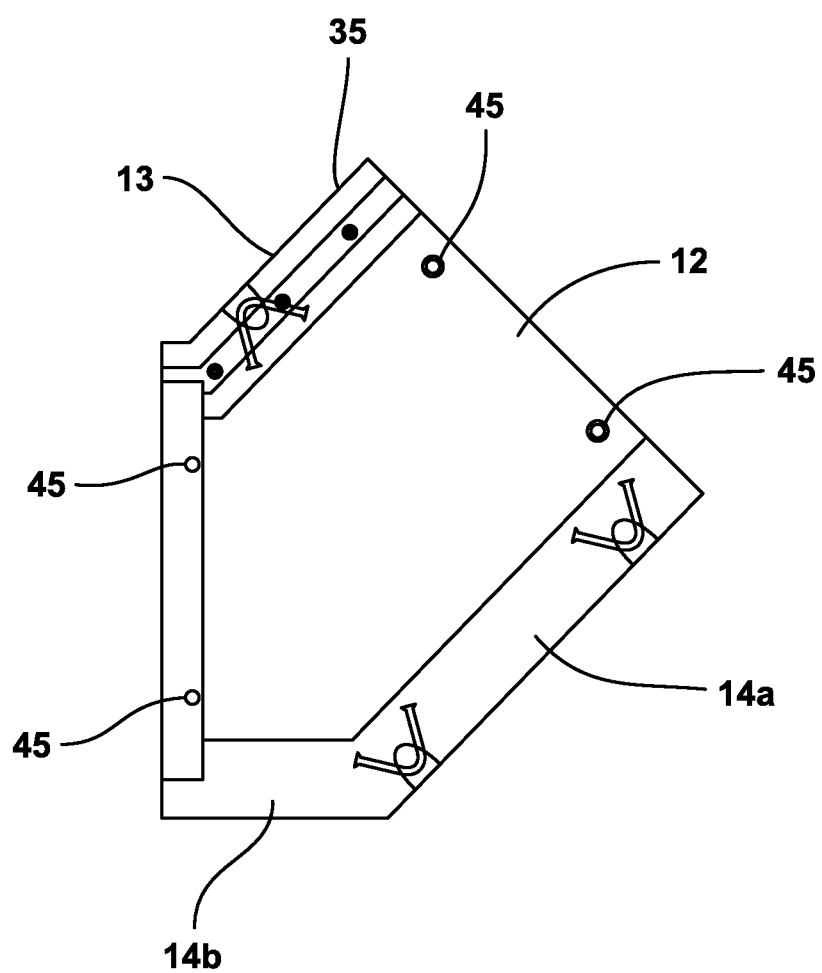
FIG. 12 is a fragmentary plan view of a preferred embodiment of the apparatus of the present invention showing a trough section for a turn or bend.
Figure 13:
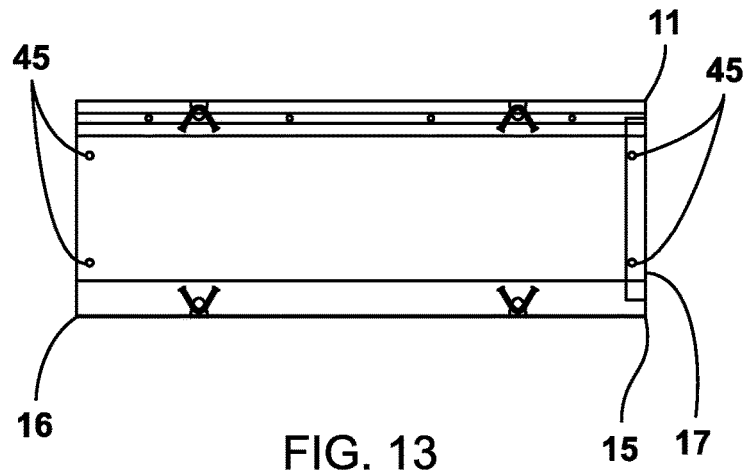
FIGS. 13-16 are top, side and end views of a straight trough portion of a preferred embodiment of the apparatus of the present invention.
Figure 15:
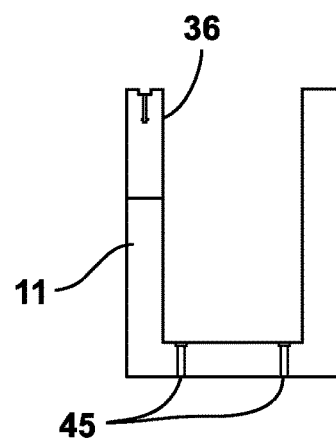
Figure 14:
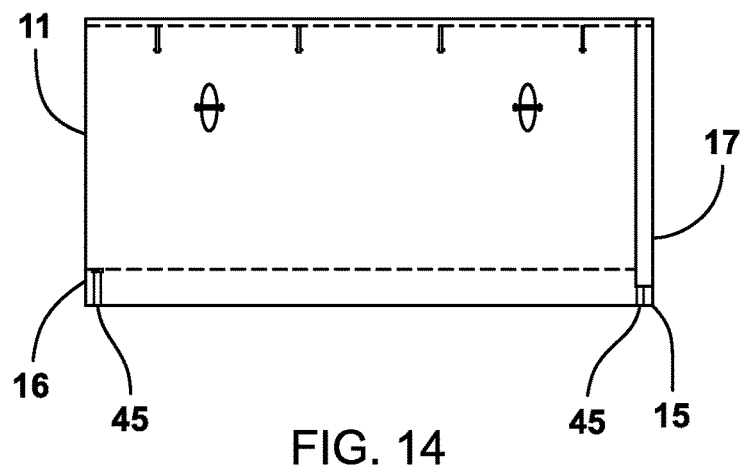
Figure 16:
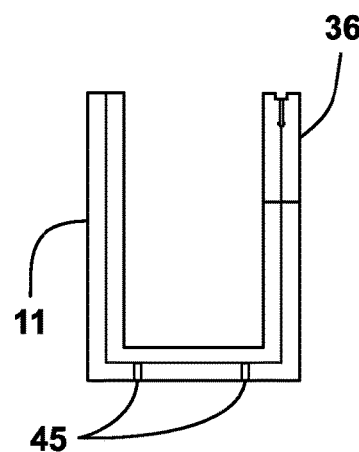

FIGS. 1-43 show preferred embodiments of the apparatus of the present invention designated generally by the numeral 10. Cryogenic containment trough or trench apparatus 10 preferably provides multiple, connectable trench or trough sections 11 connected end to end (see FIGS. 7 and 8). Each trough section 11 preferably has a bottom wall 12 and side walls 13, 14. Each trench or trough section 11 has opposing end portions 15, 16. Two or more such sections 11 are preferably connectable end to end using interlocking connections 17 (e.g., tongue and groove). In some cases, the sections 11 are preferably spaced apart (e.g., one inch) to provide a gap or joint 80 that can be filled with a seal or sealer. FIGS. 2-11 show examples of straight trough sections 11. Some trough sections can be corner trough sections 33, 34, 35. Corner trough section detail examples are seen in FIGS. 8 and 12.

Panels 20, 21, 22 are preferably applied (with adhesive such as a bonder paste commercially available from Chemco Systems of Redwood City, Calif.) to the sections 11. Panels 20, 21, 22 are preferably made of a cryogenic grade insulating material 28. The material 28 can be for example from Chemco Systems of Redwood City, Calif. sold under the trademark InsulPOX. Panels 20 are preferably applied to bottom wall 12. Panels 21 are preferably applied to side wall 13. Panels 22 are preferably applied to side wall 14. Panels 20-22 are preferably spaced away from each end portion 15, 16 of a section 11 so as not to interfere with the interlocking connection 17. These panels 20-22 can be insulative when subjected to contact with a cryogenic temperature such as the cryogenic temperature of LNG (about −260° F., −162° C.).

Figure 1:
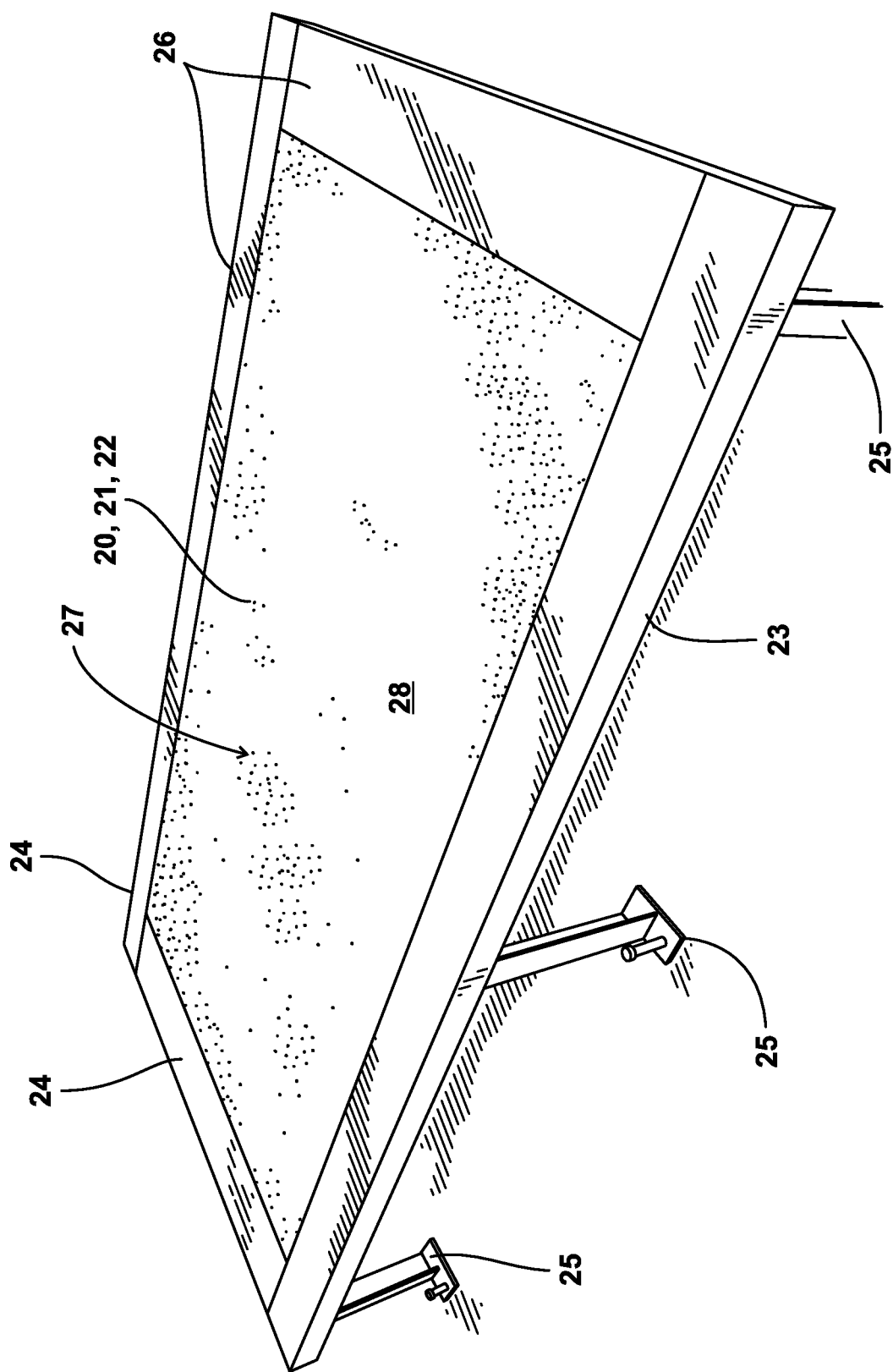
FIG. 1 is a partial perspective view of a preferred embodiment of the apparatus of the present invention and showing part of a method of the present invention.
Figure 2:
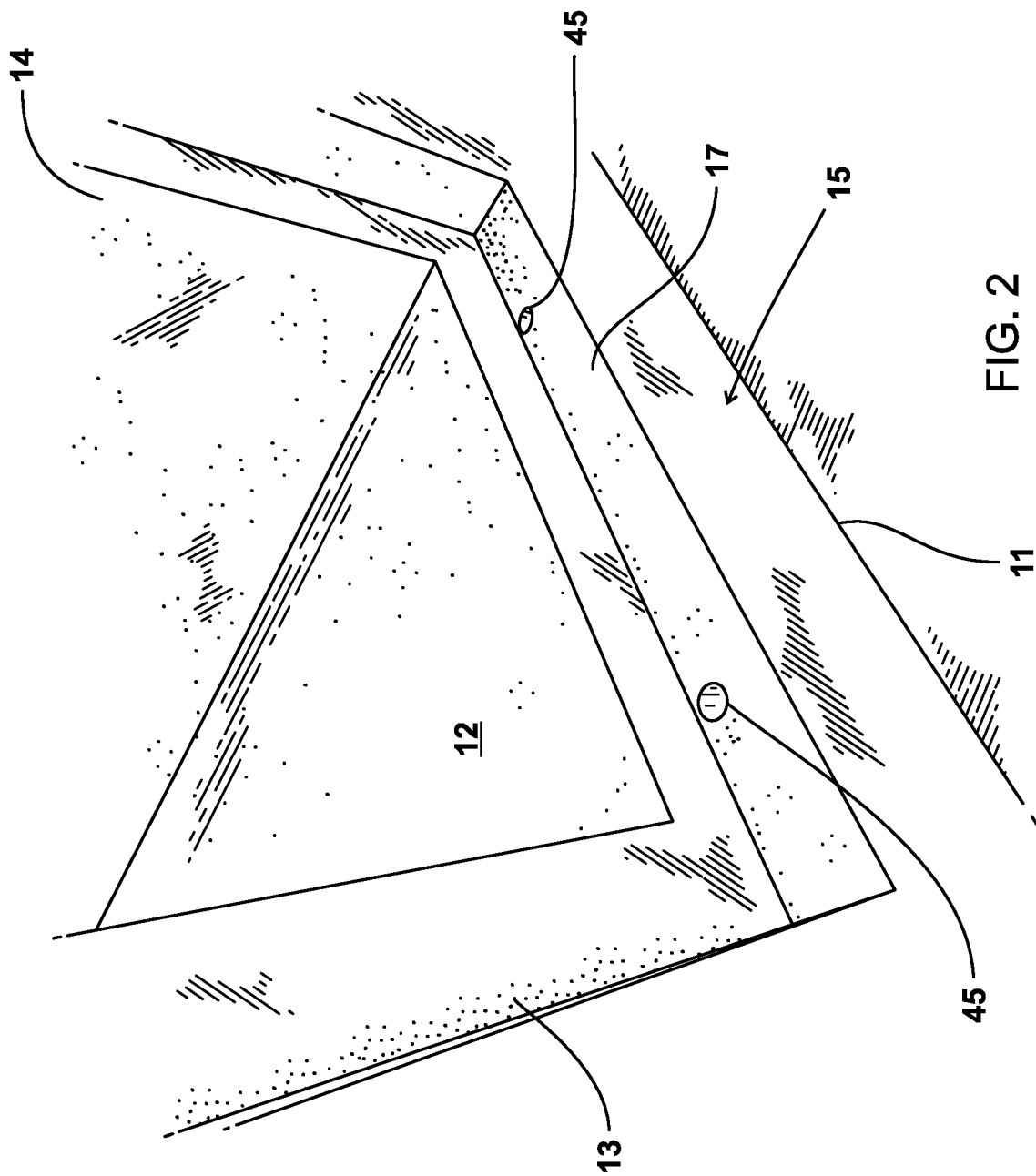
FIG. 2 is a partial perspective view of a preferred embodiment of the apparatus of the present invention and showing part of a method of the present invention.

In FIG. 1, panels 20-22 are fabricated in molds 23. Each mold 23 has a frame 24 that can include legs 25 and rectangular periphery 26. Frame 24 also includes a bottom panel. Panels 20-22 can be about one to three inches thick.

Each mold 23 has a mold cavity 27 that is preferably filled with a cryogenic grade insulating polymer concrete material 28 such as, for example, sold under the trademark InsulPOX. Before adding the insulating polymer concrete material 28 to cavity 27, the cavity 27 is preferably coated with a release material, preferably lard (commercially available, sold under the trademark Armour®).

The insulating polymer concrete material 28 can be initially a liquid or slurry. After addition to cavity 27, it preferably hardens to form a rigid panel or solid panel 20, 21, 22. In mold 23, the material 28 is preferably self leveling. Because the mold 23 has a horizontally extending cavity 27, a panel 20, 21, 22 is preferably formed of uniform thickness (e.g., about 1-3 inches). The trough or trench section 11 to which panels 20, 21, 22 are applied are of precast concrete, preferably reinforced concrete.

Figure 3:
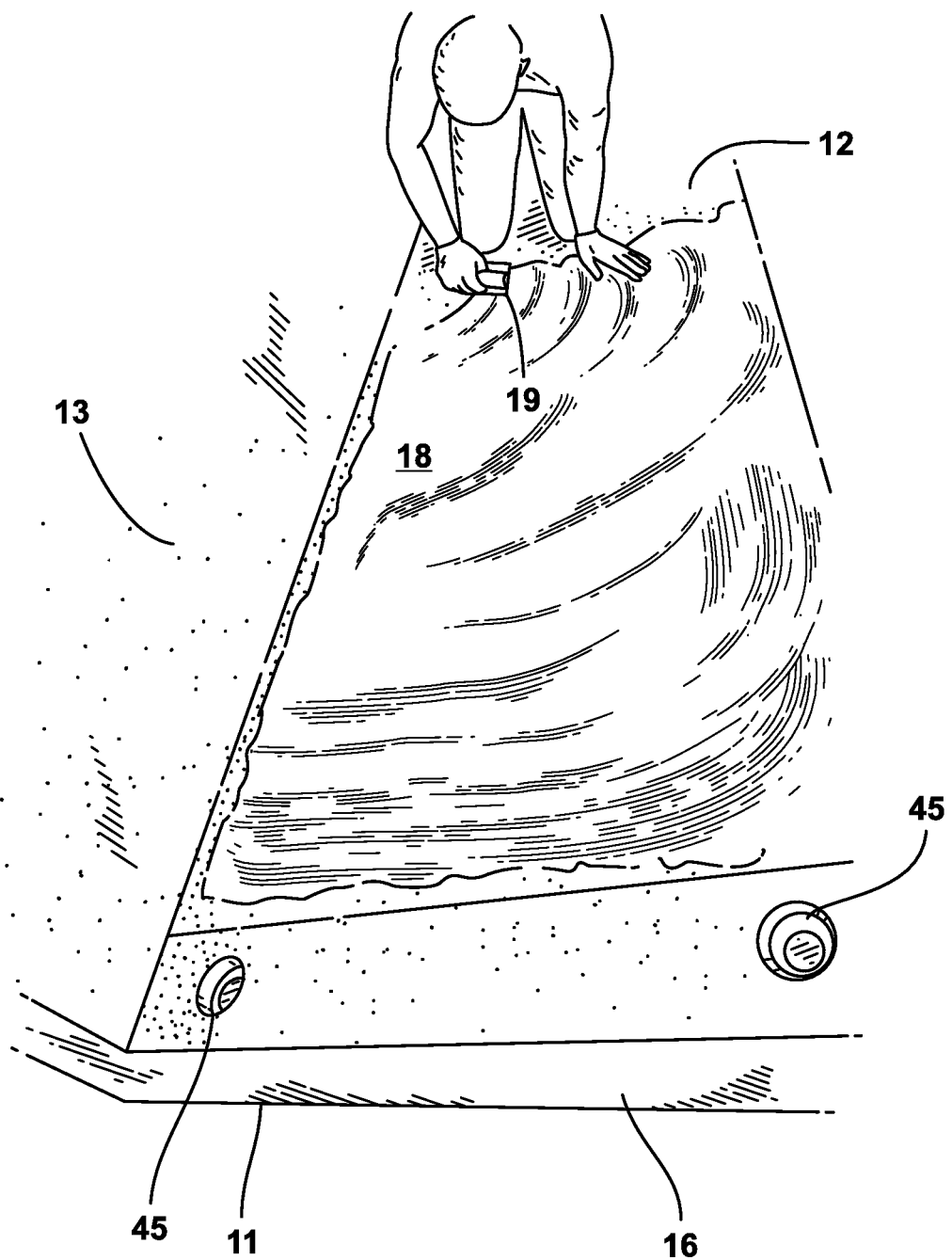
FIG. 3 is a partial perspective view of a preferred embodiment of the apparatus of the present invention and showing part of a method of the present invention.
Figure 4:
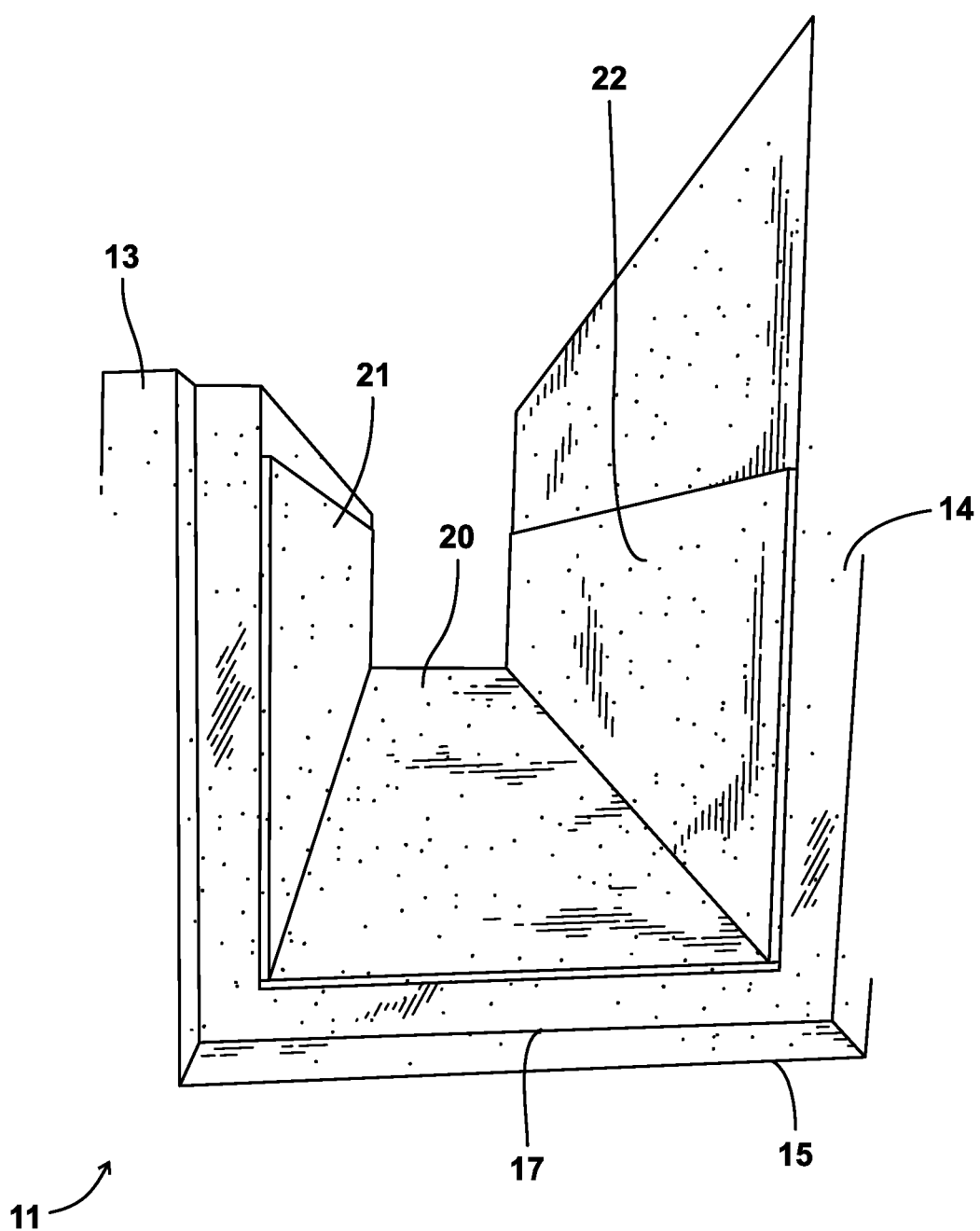
FIG. 4 is a partial perspective view of a preferred embodiment of the apparatus of the present invention and showing part of a method of the present invention.
Figure 5:
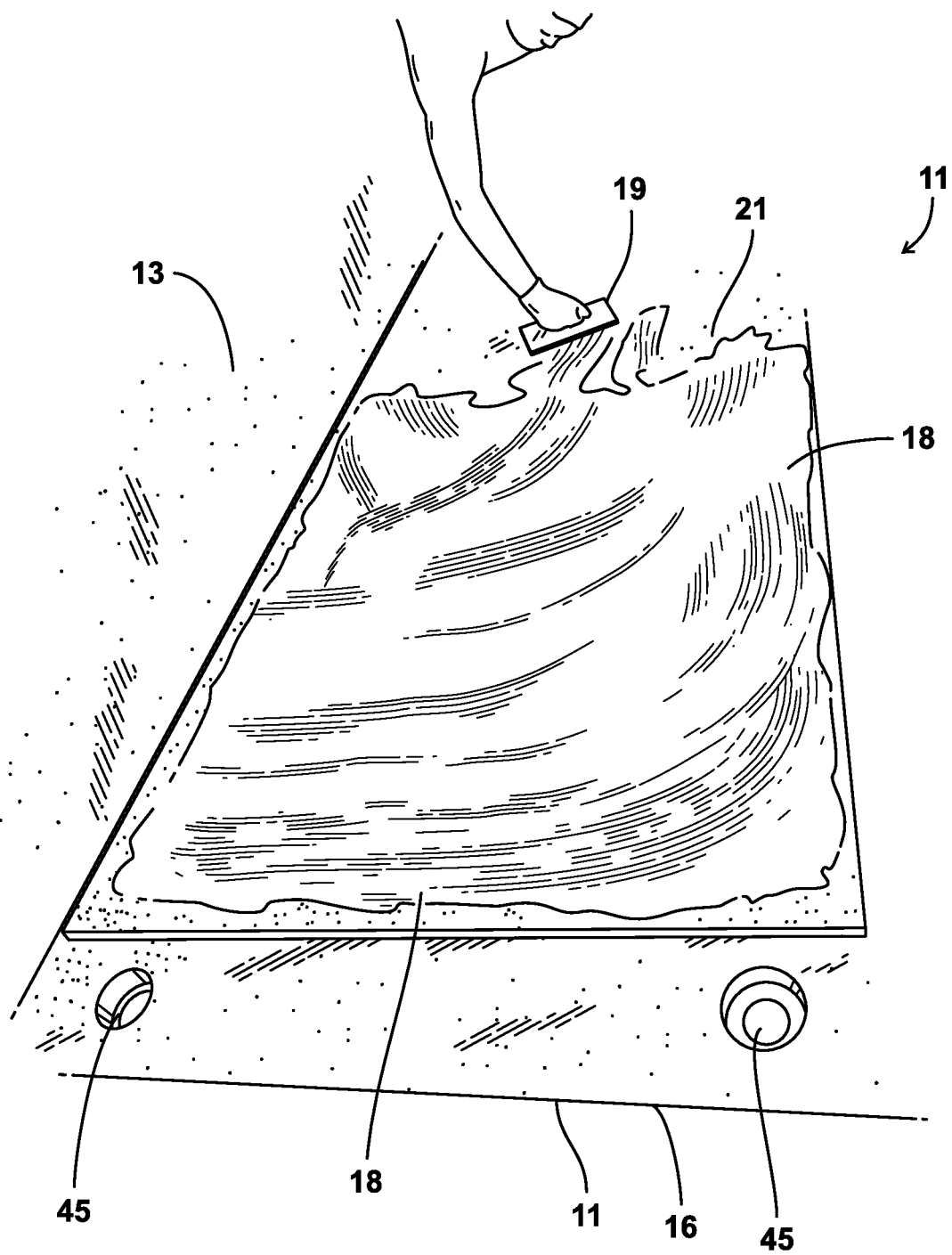
FIG. 5 is a partial perspective view of a preferred embodiment of the apparatus of the present invention and showing part of a method of the present invention.
Figure 6:
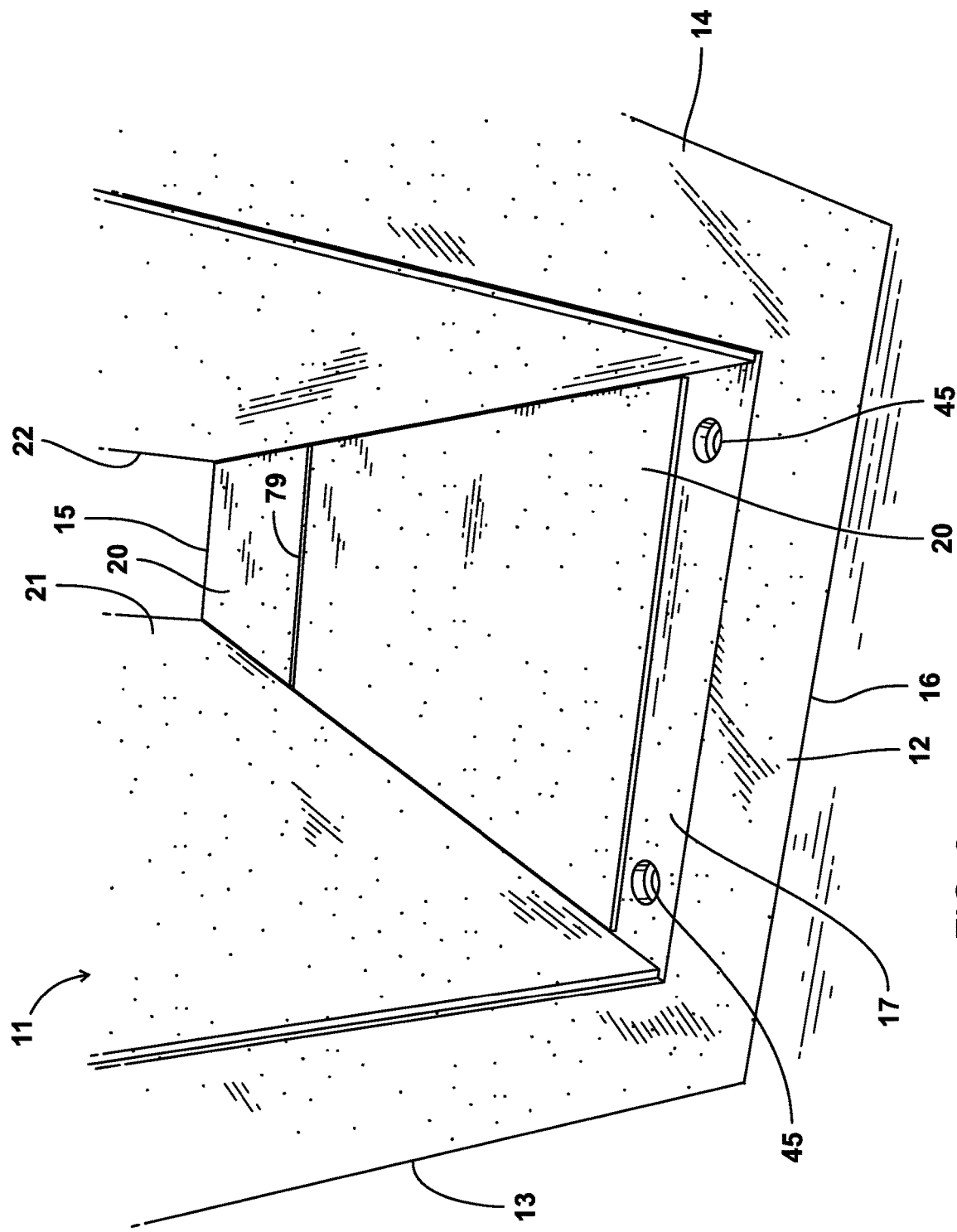
FIG. 6 is a partial perspective view of a preferred embodiment of the apparatus of the present invention and showing part of a method of the present invention.
Figure 7:
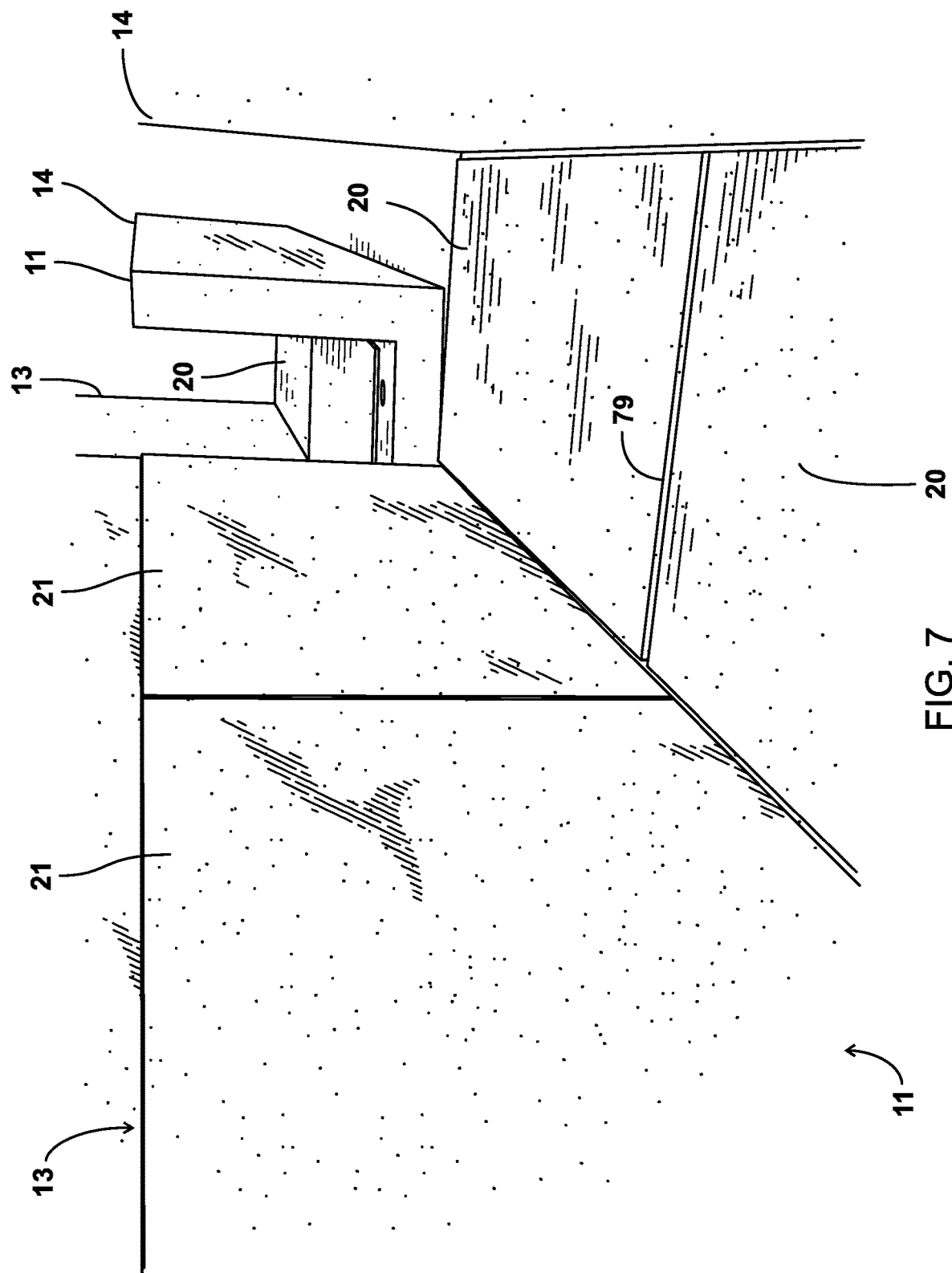
FIG. 7 is a partial perspective view of a preferred embodiment of the apparatus of the present invention and showing part of a method of the present invention.

To apply a panel 20, 21, 22 to a precast concrete trench section 11, the lower surface of the panel 20, 21, 22 is preferably first cleaned of the lard (e.g., power washed). The opposite or upper side of the panel is preferably covered with adhesive 18 as seen in FIG. 3. Adhesive 18 can be hand applied with a tool (i.e., trowel) 19. Bottom wall 12 and side walls 13, 14 can also be covered with adhesive 18 to adhere panels 20, 21, 22. Multiple panels 20, 21, 22 may be used on a wall 12, 13, 14 of section 11. Preferably, a non-sag sealant 82 can be used in gap 79 in between multiple panels 20, 21, 22, as seen in FIGS. 6 and 7.

When two sections 11 are connected end to end at the interlocking connection 17 (e.g., tongue and groove), the end portions 15 or 16 of two sections 11 may need to be sealed with a sealed non-sag sealing material 82, as this area at the joint is not always not covered with a panel 20, 21 or 22. Sealant 82 can be a sealant in between insulation panels for LNG spill containers. Such non-sag sealer 82 for use with cryogenic temperatures can be commercially available from Chemco Systems of Redwood City, Calif. sold under the trademark InsulPOX, or a butyl rubber elastomer available from Valpac, Inc. sold as Cryo-bond 837. Butyl Rubber Elastomer. Sealing material 82 is preferably a non-sag material that can preferably withstand cryogenic temperatures. Sealing material 82 is preferably resistant to mechanical and thermal shocks. Sealing material 82 preferably creates a liquid tight seal in between panels 20, 21, 22. Panels 20, 21, 22 are preferably not positioned next to another panel 20, 21, 22, as experimental sections showed that the panels 20, 21, 22 cracked under thermal expansion and contraction.

Preferably the joint or gap 80 in between end portions 15 or 16 of two sections 11 can be sealed with a combination of one or more layers of a mesh or woven material 81 and non-sag sealer 82. Preferably, there are two layers of the mesh or woven material 81 and the non-sag sealer 82. Once the layers of mesh 81 and sealer 82 are in place, cryogenic sealing material 82 can be painted over the filled joint 80. Preferably, there is about 40 mils in thickness of the non-sag sealant 82 in joint or gap 80.

Preferably, panels 20, 21, 22 are sized and shaped to cover the entire wall 12, 13, 14 that it is adhered to. If a panel 20, 21, 22 does not extend to the end of section walls 12, 13, 14, an extender strip is preferably used. The extender strip can be made of the same cryogenic material as the panels 20, 21, 22. Preferably, end portions 15 or 16 of two sections 11 can be sealed horizontally in between the bottom walls 12 of each section 11. Preferably, end portions 15 or 16 of two sections 11 can be sealed vertically in between the side walls 13 and 14 of each section 11. The combination of the panels 20, 21, 22 and the sealed joint 80 using mesh 81 and sealer 82 at interlocking connection 17 preferably creates continuous cryogenic material from panels 20, 21, 22 of one section 11 to the panels 20, 21, 22 of the connecting section 11. Preferably, the cryogenic sealed joint 80 bonds or bridges panels 20, 21, 22 of each adjacent section 11.

Mesh or woven material 81 can be an engineering fabric or polymeric mesh material, such as polypropylene, such as ITW Engineered Polymers Type Y-4"—Crack Repair Tape, or white polyester fabric such as sold by Carlisle Coatings & Waterproofing Incorporated under the brand DCH Reinforcing Fabric Cloth. The mesh or woven material 81 preferably provides a more viscous seal than adhesive alone. The mesh or woven material 81 preferably allows for any thermal contraction and expansion of concrete walls 12, 13,14 and panels 20, 21, 22.

In some experimental sections, InsulPOX was used in gap or joint 80 in between two sections 11, however InsulPOX developed cracks and appeared to be ineffective under thermal conditions and elongation properties of concrete and cryogenic material. In some experimental sections, 3M brand products (2216NS-modified Tan (epoxy)) were used, however they appeared ineffective. Testing showed that Valpac, Inc. Cryo-bond 837 Butyl Rubber Elastomer could preferably be used as the sealant for gap or joint 80.

A thixotrope can be added into the non-sag sealer Cryo-bond 837 to preferably thicken the non-sag sealer Cryo-bond 837. The thixotrope can preferably shorten the pot life of the non-sag sealer Cryo-bond 837.

The present invention also includes a method of installing a trench 10 for containing a cryogenic spill, comprising the steps of:

a) construction multiple precast concrete sections 11, each section preferably having a bottom wall 12 and spaced apart side walls 13, 14 connected to and extending up from said bottom wall 12;

b) wherein in step "a" each section 11 can have end portions 15, 16 that enable connection to another said concrete section 11;

c) at the first location, preparing multiple panels 20, 21, 22 of polymeric concrete material 28 by filling one or more molds 23 with a slurry or liquid polymeric concrete material 28 and after time allowing the material to cure and harden;

d) wherein in step "c" the mold 23 has a cavity 27 that is preferably lined with a release material;

e) at the first location, preferably adhering one or more of said panels 20, 21, 22 of step "c" to the bottom wall 12 and side walls 13, 14 of each said concrete section 11 using an adhesive 18;

f) after step "e", preferably transporting the concrete sections 11 from the first location to a second location;

g) at said second location, preferably connecting the concrete sections 11 together using connections 17 of one end portion 15 to another end portion 16; and h) preferably applying a sealant 82, such as an epoxy grout or a butyl rubber elastomer, to the connections 17 of step "g" at the second location.

Preferably, prior to adding a sealant 82 in step "h", one or more seals 62 preferably made of a polyethylene extruded closed cell foam (e.g., Backer Rod such as SSI brand polyethylene extruded closed-cell foam backer rod, or other suitable material) can be placed at the bottom of the gap or joint 80 in between concrete sections 11. Seals 62 can be round or other suitable shape. Seals 62 can have compressible properties. A Polyurethane Non-Sag Joint Sealant 83, such as Sikaflex 1A brand polyurethane elastomeric non-sag sealant, can be applied in the joint space 80 on top of seals 62. Polyurethane Non-Sag Joint Sealant 83 can preferably fill joint or gap 80 to a point that it is preferably flush with the top surface. Polyurethane Non-Sag Joint Sealant 83 can be a mechanical backing for cryogenic material and is preferably a liquid seal.

In one embodiment, the Polyurethane Non-Sag Joint Sealant 83 can be installed in the joint space 80 over seal 62 (i.e., backer rod), then a base coat of sealant 82 (i.e., Cryo-bond 837). A mesh or cloth material 81 can be layered on top of sealant 82, wherein the mesh material 81 is preferably saturated, and then top-coated with sealant (i.e., Cryo-bond 837).

Preferably, in step "h" a joint or gap 80 in between end portions 15 or 16 of two sections 11 can be sealed with a combination of one or more layers of a mesh or woven material 81 and non-sag sealer 82.

Preferably, a xylene solvent cleaner can be applied on top of the sealed joint of step "h". The xylene solvent cleaner can evaporate off in time.

Preferably, each panel 20, 21, 22 can have an upper surface and a lower surface and further comprising applying the adhesive 18 in step "e" to the upper surface.

Preferably, after step "d" the lard is removed from the lower surface of each panel 20, 21, 22.

Preferably, each panel 20, 21, 22 is between about one half and three inches thick.

Preferably, each panel 20, 21, 22 can have a generally rectangular periphery.

Preferably, the liquid polymeric concrete material 28 can be a cryogenic insulating material.

Preferably, the release material can include animal fat.

Preferably, the release material can include lard.

Preferably, at least one of the side walls 13, 14 has a maximum side wall height and wherein the panels 21 or 22 extend vertically only part of the maximum side wall height.

Preferably, the precast concrete sections 11 have openings 45 having recess 40 through the bottom wall 12 at one or both of said end portions 15, 16.

FIG. 8 shows an exemplary diagram for the overall trough system 10 as well as samples of individual trough sections. In FIGS. 9-11, walls 13, 14 are of the same height. In one or more embodiments of section 11, one side wall can be taller than the other side wall (e.g., see FIG. 4). In one or more embodiments, a side wall 13, 14 of a section 11 can be fitted with a riser section 36 to increase side wall height (see FIG. 25).

In FIG. 8, sections 30, 32 shows a straight trough 11. In FIG. 8, the section 31 can have a bend (or bends or turns) in the overall LNG trench or trough 10 at 33, 34 and at 35. The bend or turn at 33, 34 is formed by joining section 33 to section 34. As shown, each trough section 33, 34 has an angled end portion that engages the angled end portion of the other to provide the orientation of FIG. 8. The trough section 35 has end portions that are angled relative to one another as seen in FIGS. 8 and 12 so that when section 35 is connected to section 11 as seen in FIG. 8 a bend is provided to the overall trench or trough 10.

In FIG. 8, end sections or end troughs 46 can be provided to each section 30, 31, 32.

Figure 20:
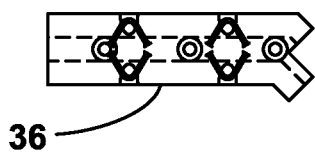
FIGS. 20-22 are top, side and end views of the trough riser portion of a preferred embodiment of the apparatus of the present invention.
Figure 21:
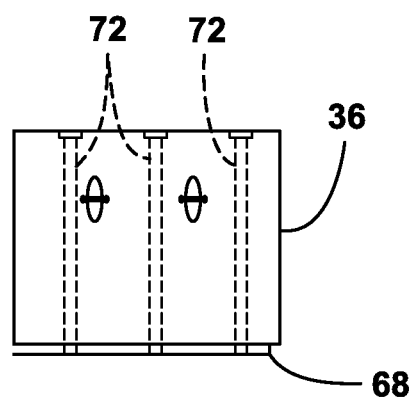
Figure 22:
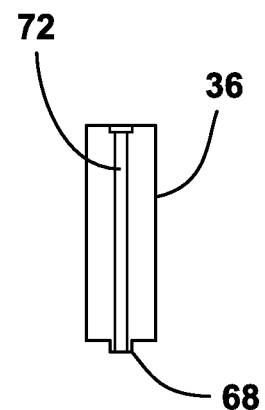
Figure 23A:
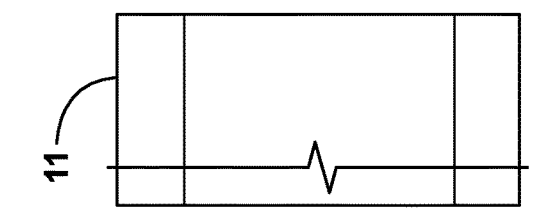
FIGS. 23A-23D are schematic diagrams of a trough lap joint detail before assembly and after assembly.
Figure 23B:
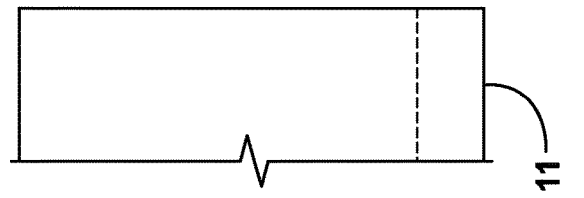
Figure 23C:
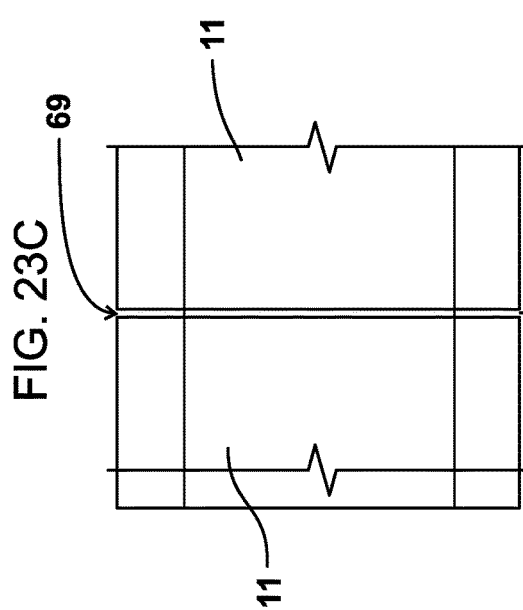
Figure 23D:
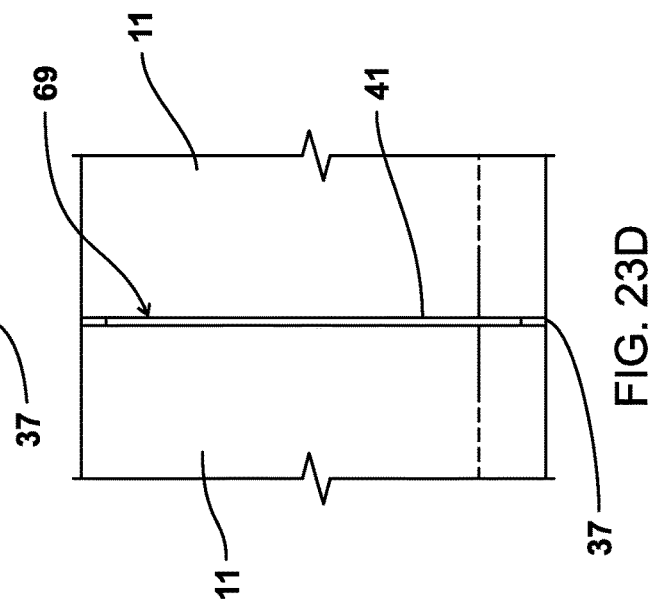
Figure 25:
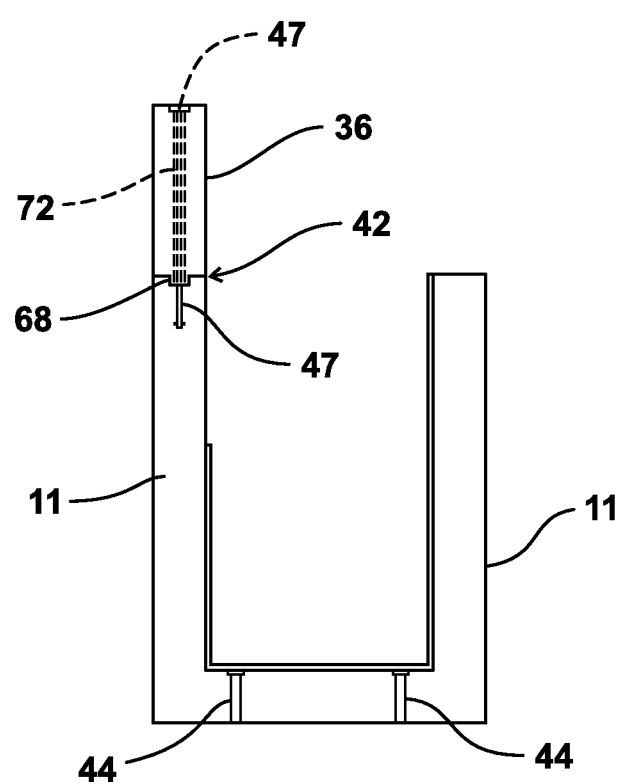
FIG. 25 is a schematic diagram of a riser to trough connection detail.
Figure 26:
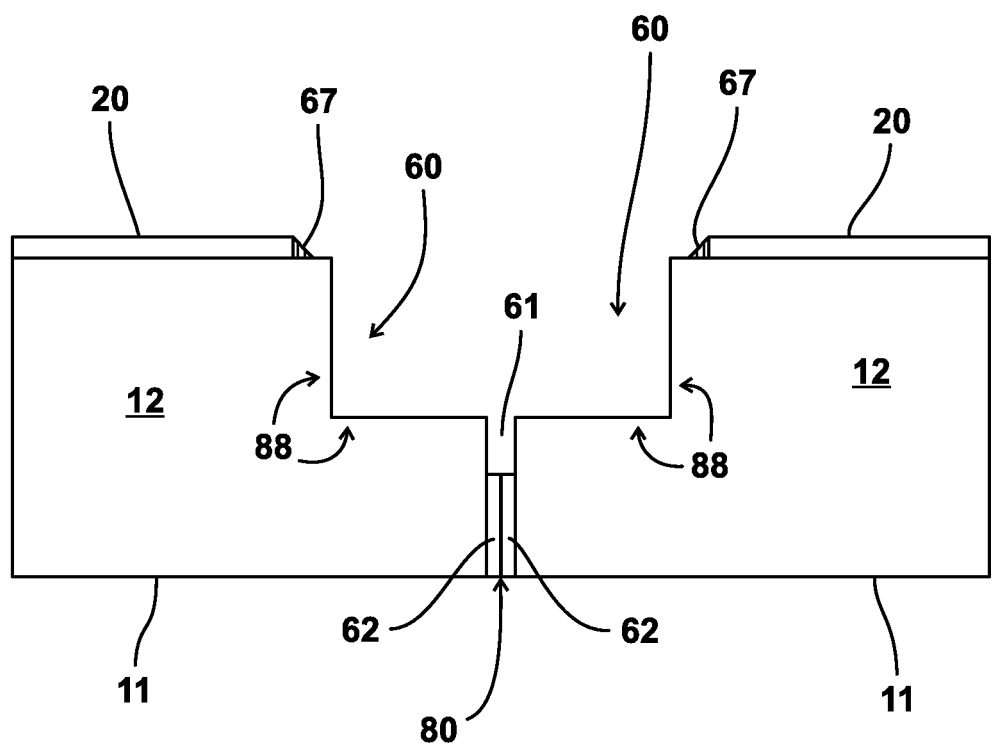
FIG. 26 is a fragmentary view that illustrates installation of a bellow joint at the interface of two precast concrete trough sections.

Wall riser sections 36 are seen in FIGS. 17-22. Wall riser 36 as seen in FIGS. 20-22 can be placed on top of wall 13 of corner trough section 35 seen in FIG. 12. FIG. 25 shows a riser 36 to trough section 11 connection detail 42. Riser 36 can have a tongue and groove connection 68 preferably at the bottom end for connection with side wall 13 or 14 of trough section 11, 35, as seen in FIGS. 12, 22, 25. A pin or pins or rod or rods or other fastener 47 can form a connection between each riser 36 and a side wall 13 or 14 of trough section 11 or 35. Each pin, rod, or fastener 47 can extend through a vertical opening or channel 72 in riser 36 (see FIG. 25). Pins, rods or fasteners 47 can connect with a section 11 by being embedded in section 11 or with a threaded connection to an internally threaded member embedded in section 11 or with an adhesive or bonding material.

Figure 39:
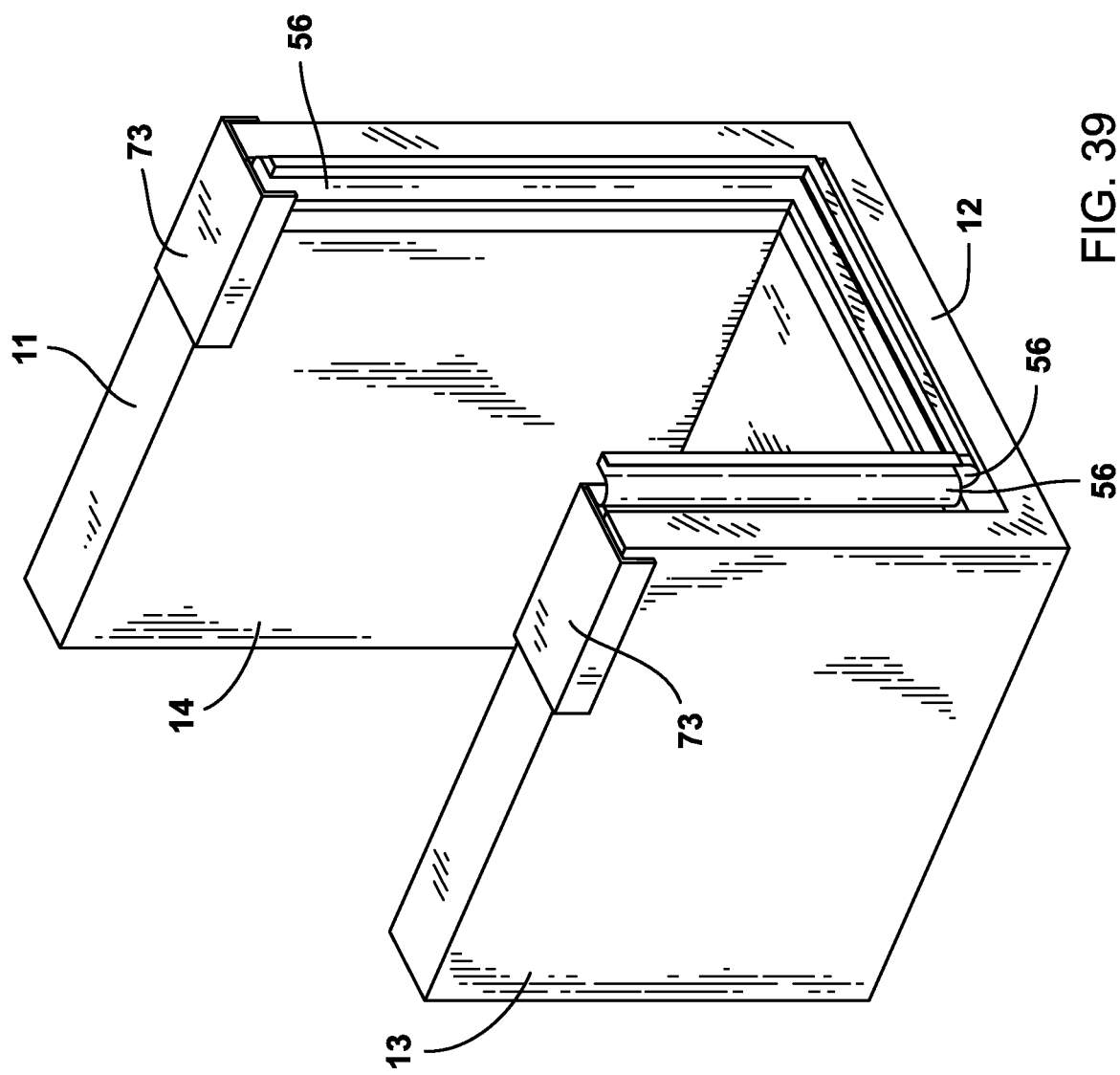
FIG. 39 is a fragmentary view that illustrates installation of a bellow joint at the interface of two precast concrete trough sections.
Figure 40:
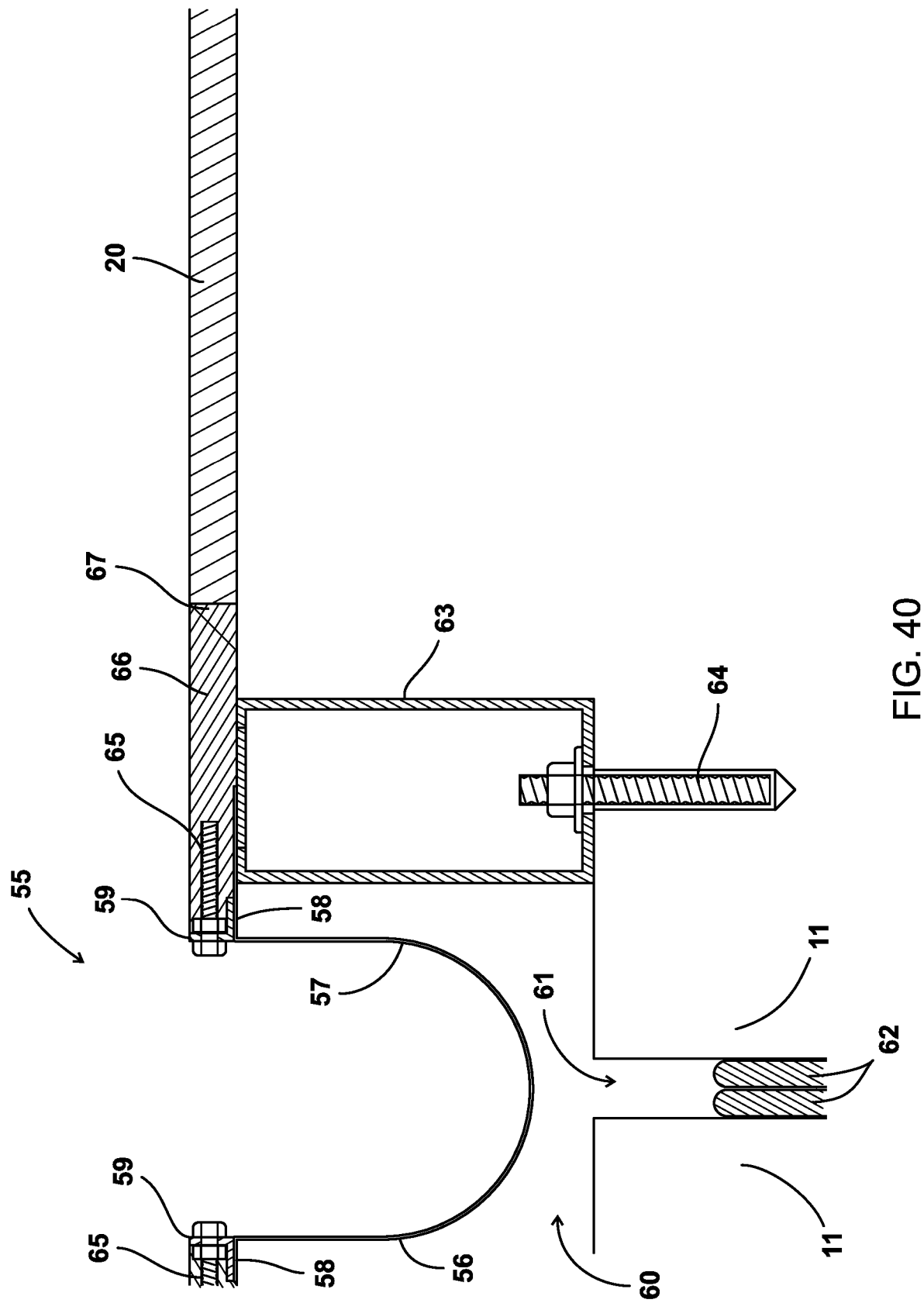
FIG. 40 is a fragmentary view that illustrates installation of a bellow joint at the interface of two precast concrete trough sections.
Figure 41:
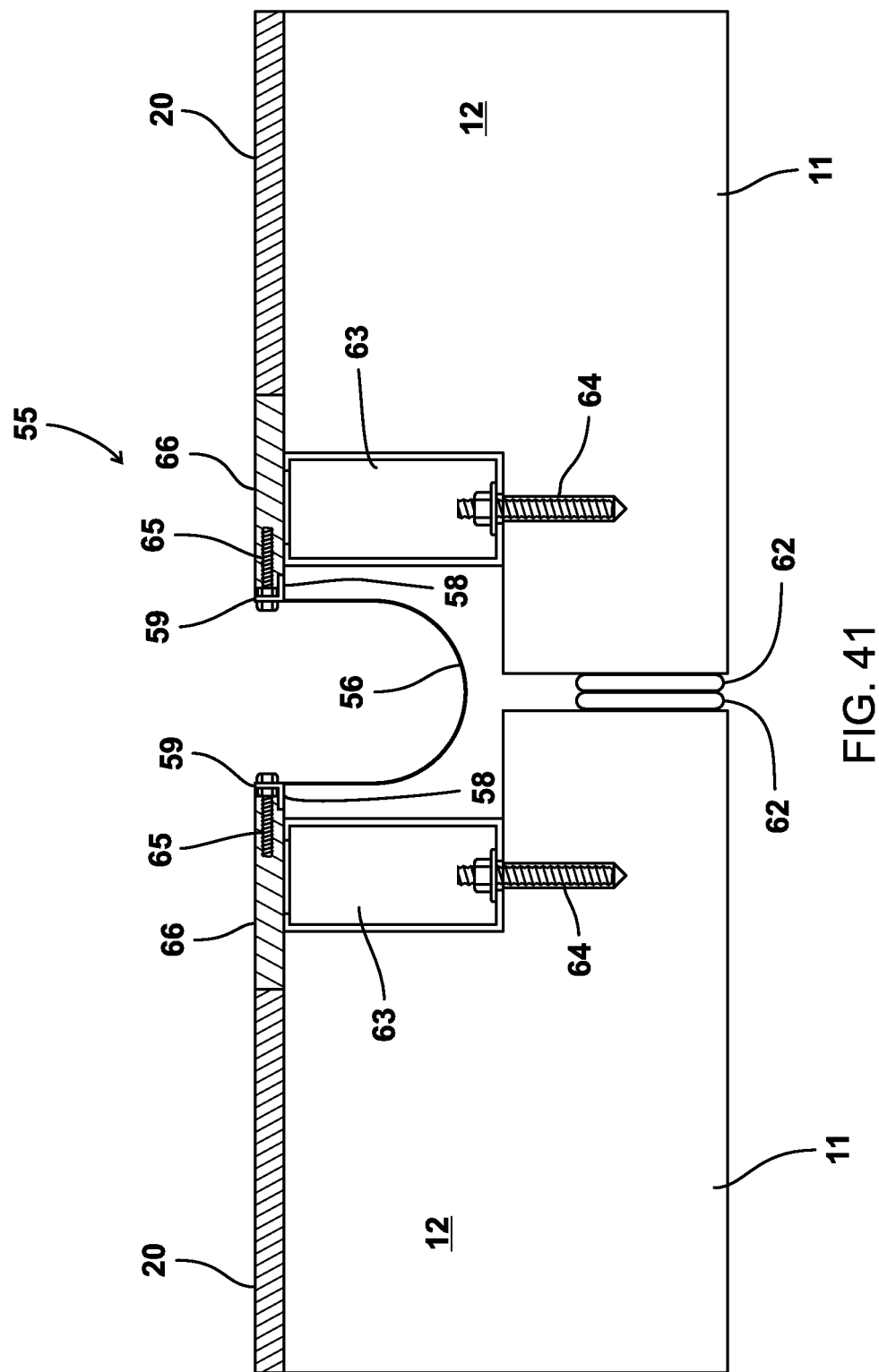
FIG. 41 is a fragmentary view that illustrates installation of a bellow joint at the interface of two precast concrete trough sections.

Gap or joint 80 in between two sections 11 can be bridged preferably with an expansive joint, such as bellow joints 54, 55, 56 seen in FIGS. 24A-D, 41, 42. Bellow joints are preferably used to bridge the bottom walls 13 of each section 11, and preferably used to bridge side walls 13, 14 of each section 11, as seen in FIG. 39.

Figure 42:
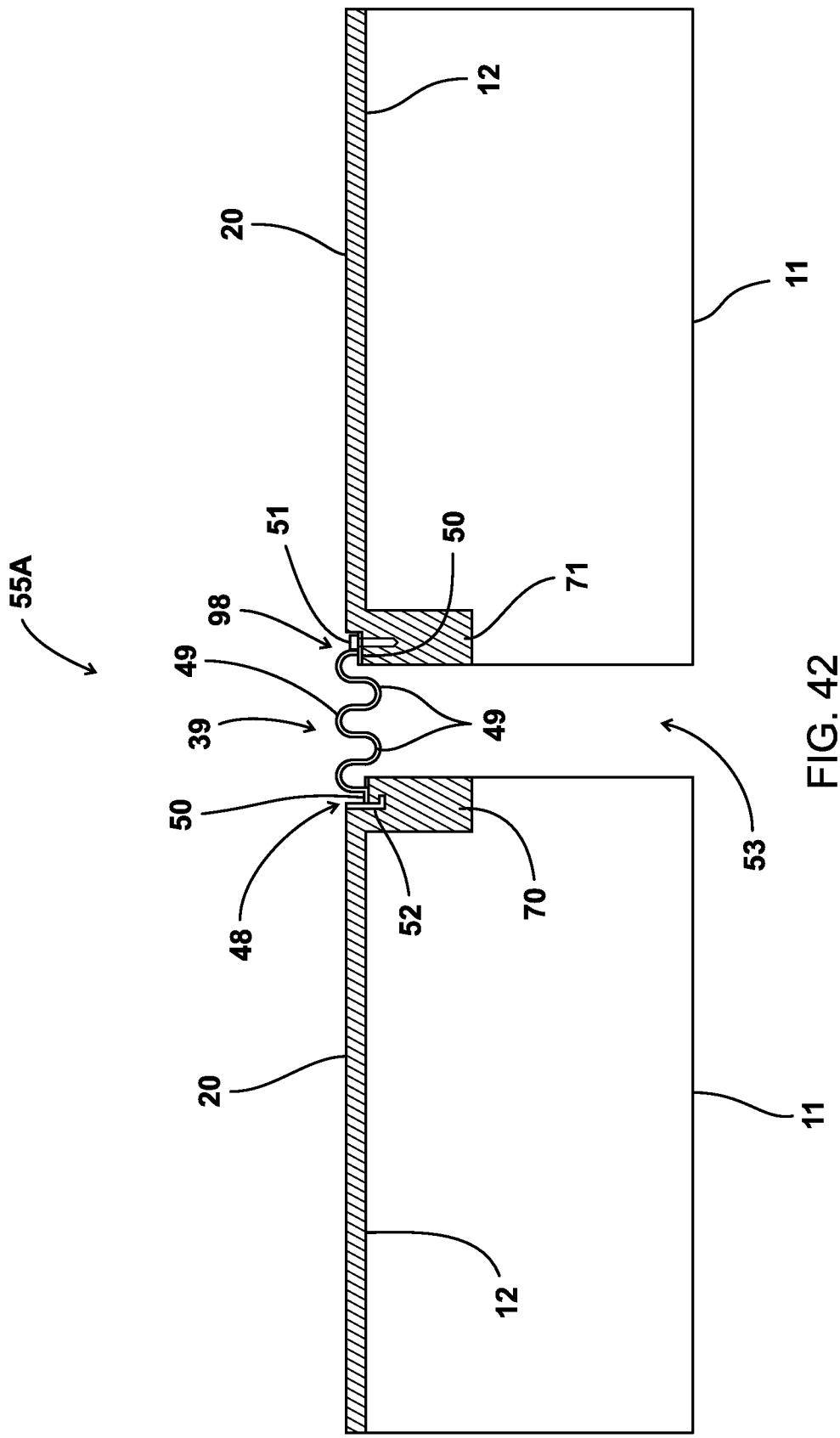
FIG. 42 is a fragmentary view that illustrates installation of a bellow joint at the interface of two precast concrete trough sections.

FIGS. 23A-23D show a trough lap joint at 37. A gap 69 (e.g., about one inch) can be provided and filled with a watertight, fire resistant seal 41 (e.g., EMSHIELD® sold by EmShield Joint Systems). Each section 11 can have openings 45 that are receptive of anchors or anchor bolts 44 in recess 40 which anchor the section 11 to a foundation (e.g., reinforced concrete). FIGS. 24A-24D show schematic diagrams of a trough expansion joint detail 38 before and after assembly. FIGS. 24A-24D show use of a bellow joint 54 in between two selected trough sections (e.g., two sections 11). The bellow 39 can be located in a void space or recess 98 at one end of a section 11 as well as in a recess 48 of another, adjacent section 11 as seen in FIGS. 24A-24D. In FIG. 42, the bellow joint 55A can include bellow 39 preferably of metal (e.g., stainless steel). In FIG. 42, the bellow joint 55A is shown as an interface between two (2) straight trough sections 11 at the bottom wall 12 of each section 11. Each section 11 provides a void space 48 or 98 for attachment to bellow 39.

Bellow 39 can have one or more curved sections 49 and opposed end portions with flanges (e.g. flat flanges) 50. Each section 11 bottom wall 12 can be fitted with a panel 20, 21, 22, adhered to the wall 12, 13, 14 with a cryogenic non-sag adhesive 18. Void spaces 48, 98 are preferably filled in the field (i.e., after delivery of precast section 11 and attached panels 20-22 to a selected locale) with a cryogenic non-sag adhesive 18. The bellow 39 is preferably secured with non-sag cryogenic sealer at 70, 71 in FIG. 42 that fills each cavity 48, 98 and with a drilled stainless steel anchor or anchor bolt 51 or stainless steel tab 52 connected to flange 50. In FIG. 42 that there is a gap 53 between the two (2) sections 11.

Figure 27:
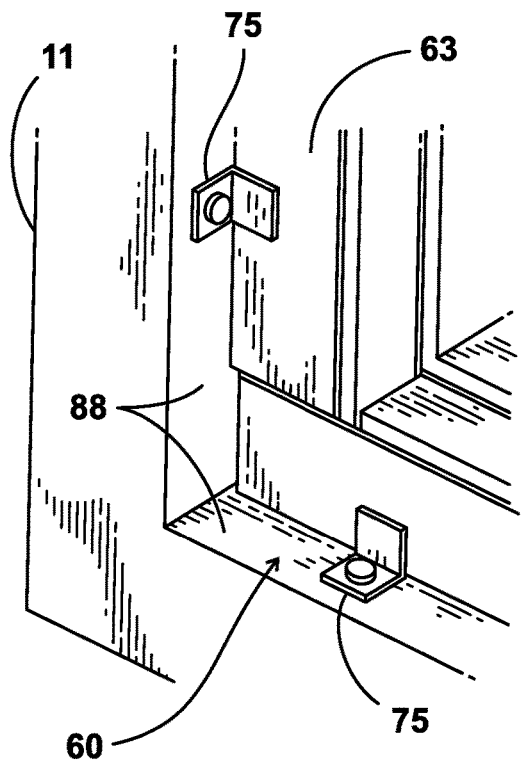
FIG. 27 is a fragmentary view that illustrates installation of a bellow joint at the interface of two precast concrete trough sections.
Figure 28:
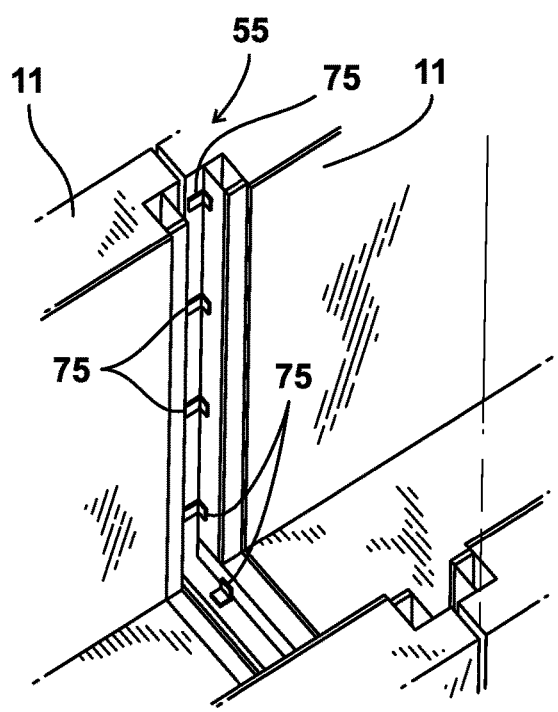
FIG. 28 is a fragmentary view that illustrates installation of a bellow joint at the interface of two precast concrete trough sections.
Figure 29:
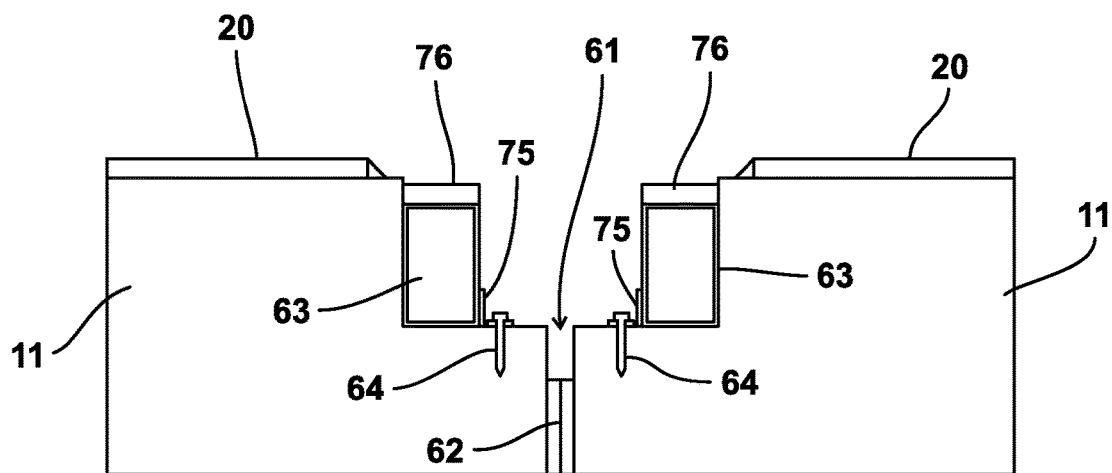
FIG. 29 is a fragmentary view that illustrates installation of a bellow joint at the interface of two precast concrete trough sections.

FIGS. 26-41 show alternate bellow joints 55. FIGS. 26-29 shows trough sections 11 having a gap 80 connected without a bellow 56. Each section 11 bottom wall 12 can be fitted with panel 20 having nosing 67. Each section 11 side walls 13, 14 can be fitted with panel 21, 22 having nosing 67. Panels 20, 21, 22 and nosing 67 are preferably made of a cryogenic material. FIG. 32 shows an alternate embodiment without nosing 67 on panels 20. Each trough section 11 can have a connecting portion 88 that preferably creates void space 60 (see FIGS. 27-29, 40-41). FIGS. 27-29 show galvanized tubing sections 63 placed in void space 60 and preferably on connecting portion 88 of each section 11. Anchors or anchor bolts 64 and angle plate/tab 75 preferably secure tubing sections 63 to trough sections 11 at void space 60. A non-sag filler 76 (e.g., commercially available under Insulpox name) can be placed over tubing sections 63 (see FIGS. 29, 31).

Figure 30:
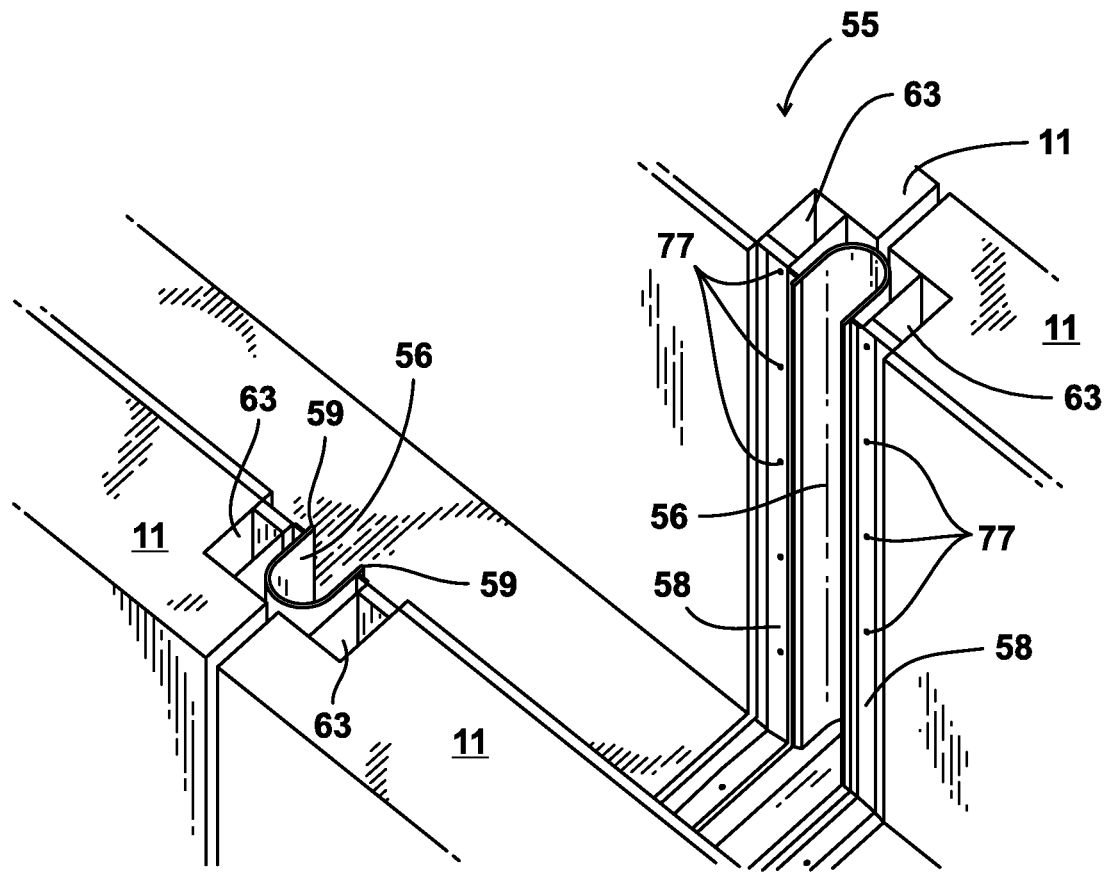
FIG. 30 is a fragmentary view that illustrates installation of a bellow joint at the interface of two precast concrete trough sections.
Figure 31:
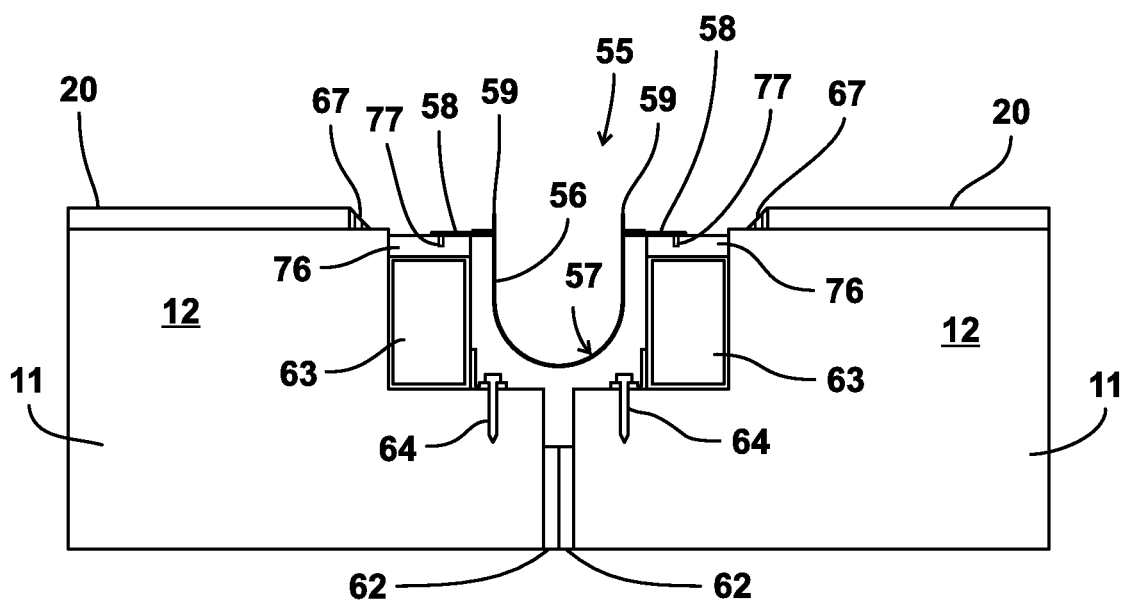
FIG. 31 is a fragmentary view that illustrates installation of a bellow joint at the interface of two precast concrete trough sections.
Figure 32:
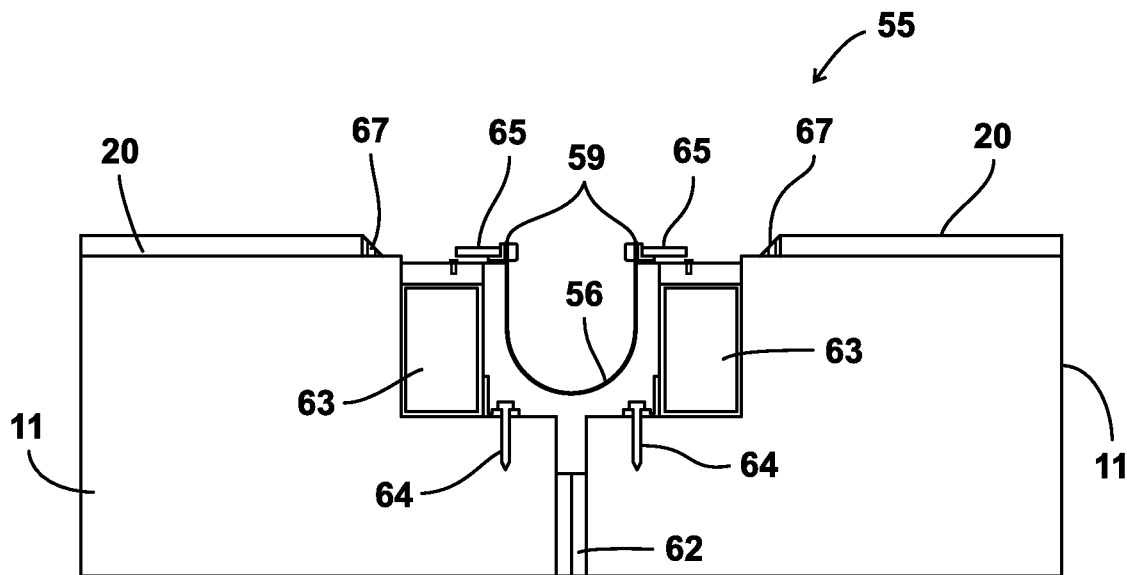
FIG. 32 is a fragmentary view that illustrates installation of a bellow joint at the interface of two precast concrete trough sections.
Figure 33:
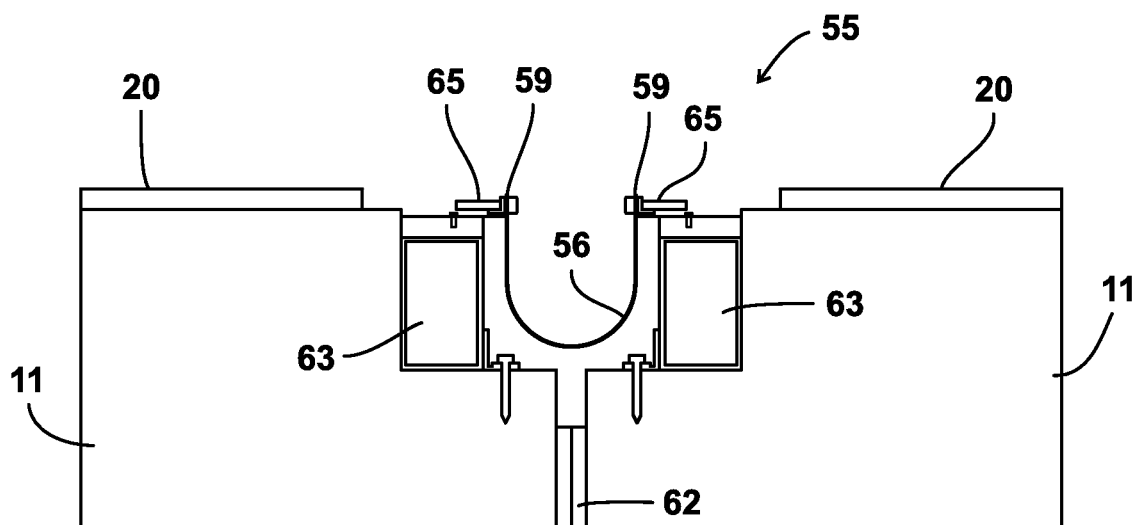
FIG. 33 is a fragmentary view that illustrates installation of a bellow joint at the interface of two precast concrete trough sections.
Figure 34:
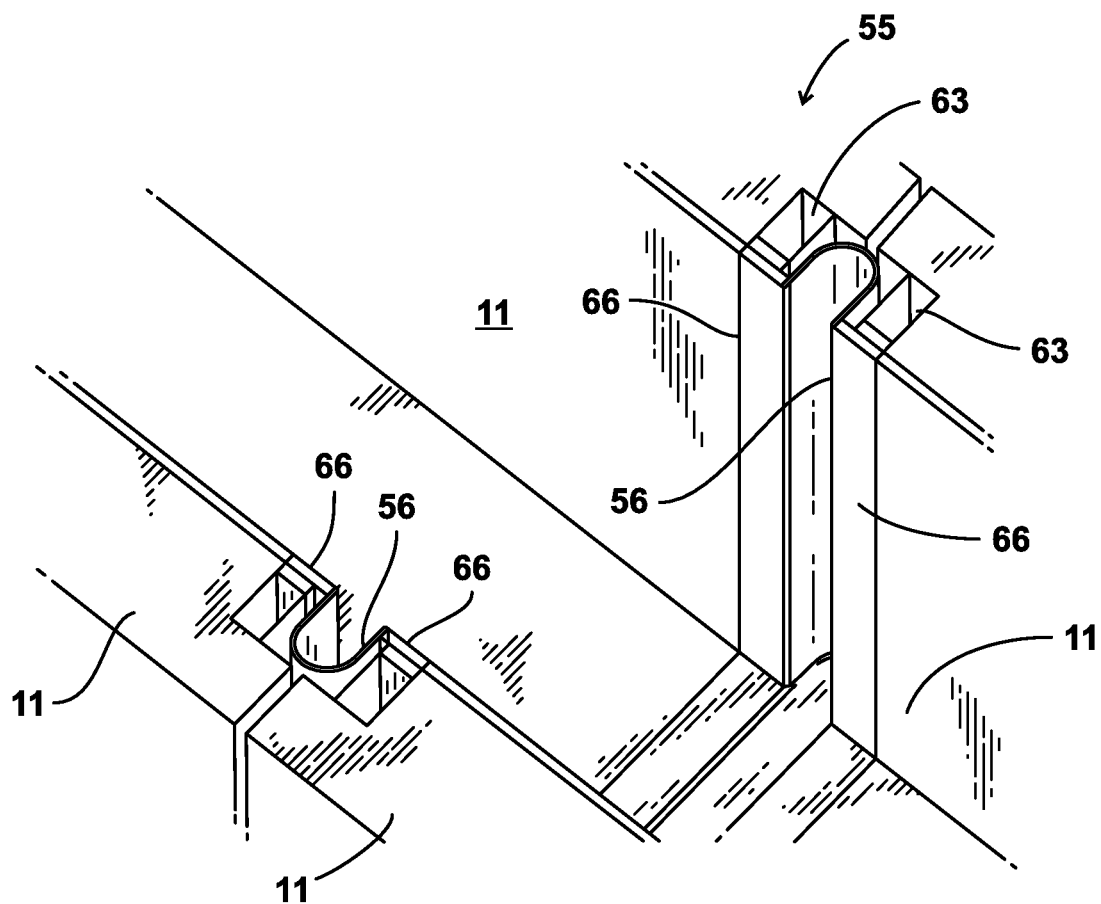
FIG. 34 is a fragmentary view that illustrates installation of a bellow joint at the interface of two precast concrete trough sections.

In FIGS. 30-41, the bellow joint 55 utilizes a bellow 56 having one curved section 57 and opposed flanges 58, each fitted with a steel angle beam 59. Fasteners 77 can be used to connect bellow flanges 58 to non-sag filler sections 76 as seen in FIGS. 30-31. Void space 60 at an end of section 11 (FIG. 26) is preferably fitted with galvanized tubing section 63 (FIG. 29). One or more seals 62 that are preferably a polyethylene extruded closed cell foam (e.g., Backer Rod such as SSI brand polyethylene extruded closed-cell foam backer rod, or other suitable material) are preferably placed in gap 61 as seen in FIGS. 26, 29, 31-33, 35, and 40-41. Seals 62 can be round or other suitable shape. Seals 62 can have compressible properties.

Figure 35:
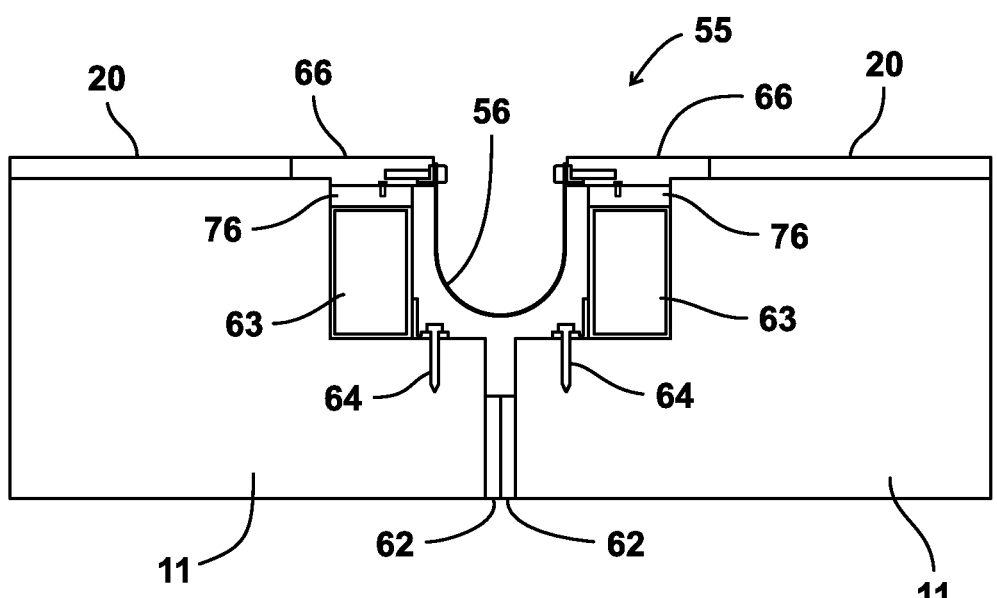
FIG. 35 is a fragmentary view that illustrates installation of a bellow joint at the interface of two precast concrete trough sections.
Figure 36:
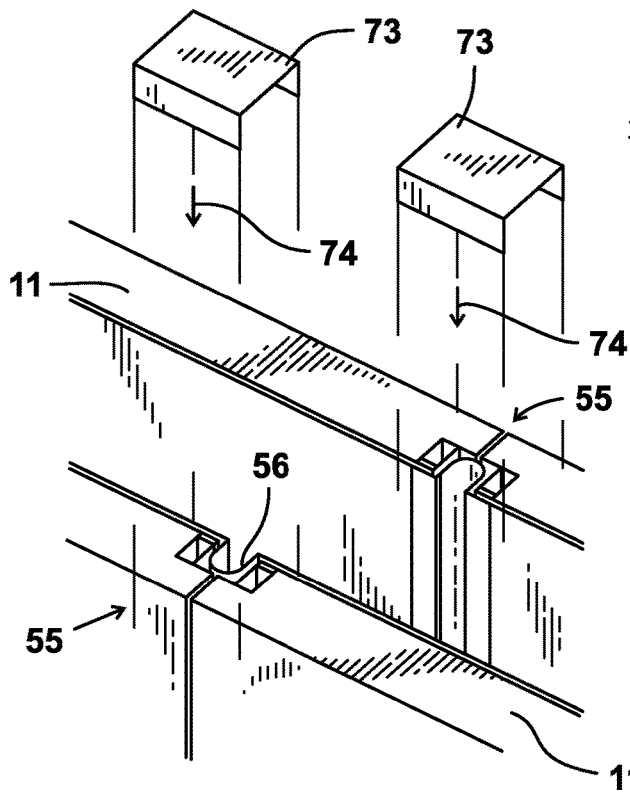
FIG. 36 is a fragmentary view that illustrates installation of a bellow joint at the interface of two precast concrete trough sections.
Figure 37:
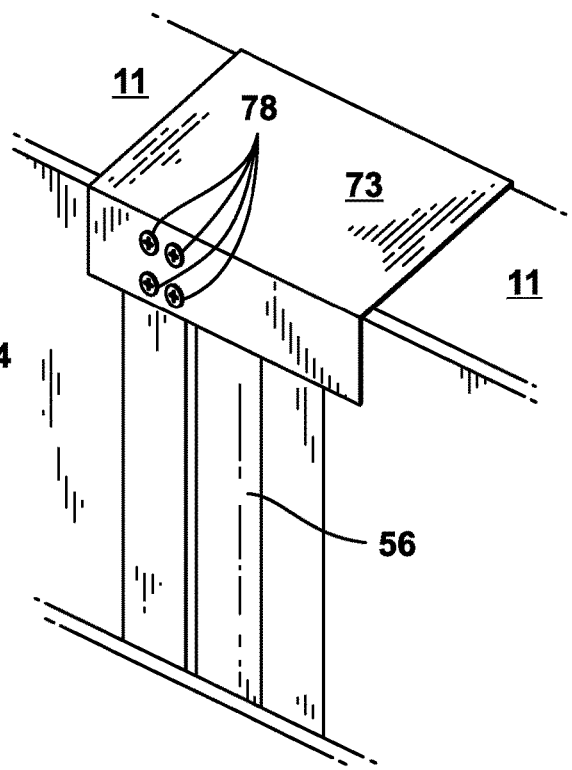
FIG. 37 is a fragmentary view that illustrates installation of a bellow joint at the interface of two precast concrete trough sections.
Figure 38:
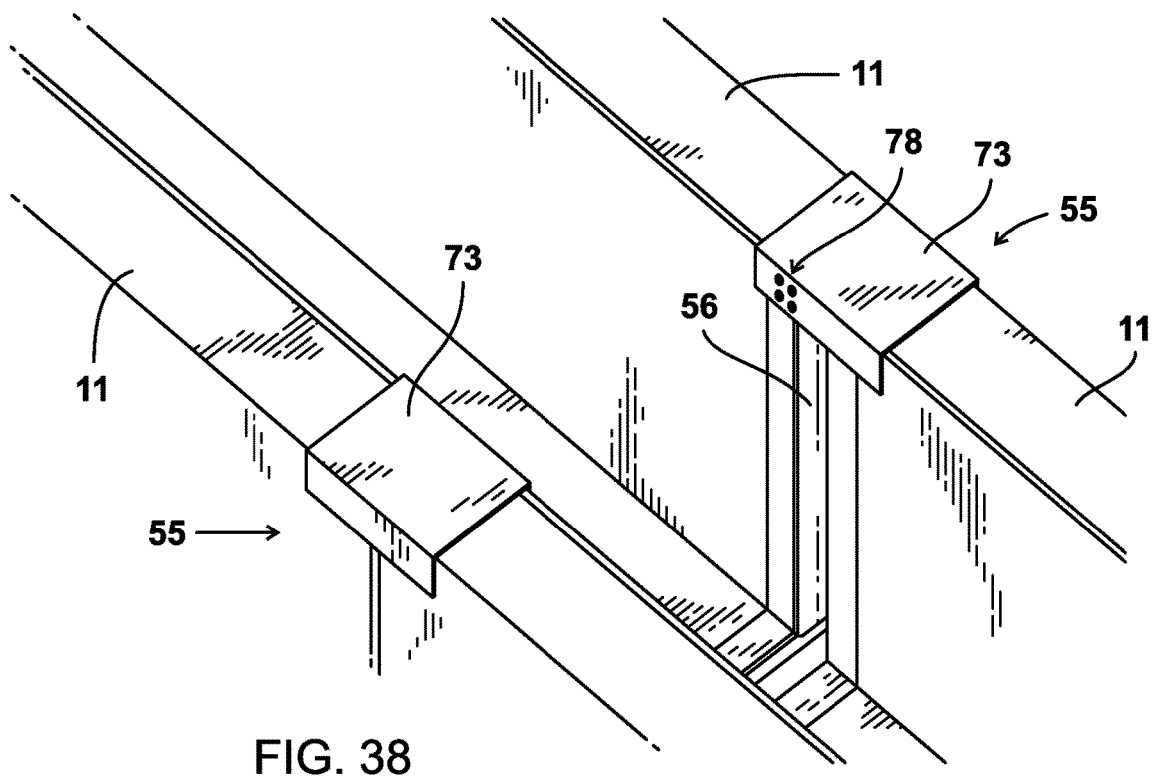
FIG. 38 is a fragmentary view that illustrates installation of a bellow joint at the interface of two precast concrete trough sections.

In FIGS. 32-41 anchor bolts or bolts 65 are preferably attached to angle beams 59 of bellows 56 before installation of non-sag filler 66 (e.g., commercially available under Insulpox name). Non-sag filler 66 is placed on top of bolts 65 and preferably filled until it is flush with the top of the adjacent panel 20, 21, 22, as seen in FIG. 35. Cover plates 73 can be used to cover joints 55, 55A (see FIGS. 36-39 and arrows 74). Bolts 78 can be used to secure plate 73.

Figure 43:
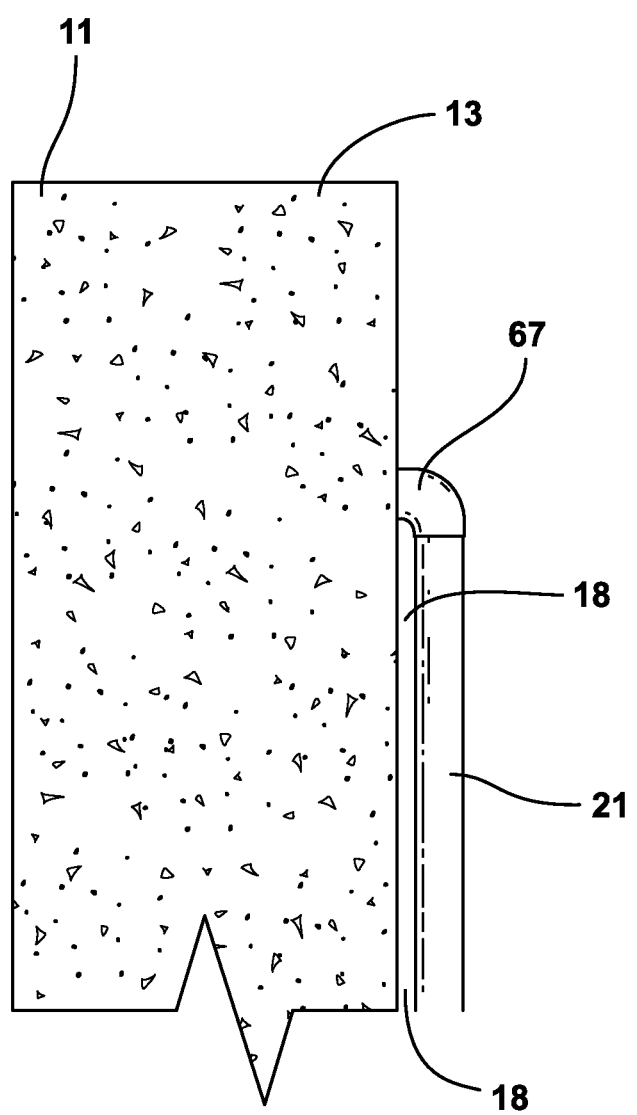
FIG. 43 is a fragmentary view of a preferred embodiment of the apparatus of the present invention showing a detail of the connection of a panel to a concrete trough or trench section.

In FIG. 43, a detail of one embodiment of the assembly of a panel 21 to a trough section 11 wall 13 is seen. Panel 21 is shown adhered to wall 13 of section 11. Bonder paste or adhesive 18 is preferably in between panel 21 and wall 13. Non sag (e.g., Insulpox) nosing 67 is preferably applied to the top of panel 21 as shown.

1. General

Waskey repairs joints in the LNG trenches that exhibit signs of cracking. The repairs preferably bring the cryogenic lining system back into a structurally sound, yet flexible, watertight joint for the precast troughs that will withstand a minimum 10 minutes of exposure of Liquid Natural Gas.

Materials 3.1. Cryobond 837 Joint Overlay 3.2. Polyurethane Non-Sag Joint Sealant (such as Sikaflex 1A brand polyurethane elastomeric non-sag sealant)

3.3. Backer Rod (such as SSI brand polyethylene extruded closed-cell foam backer rod)

3.4. Engineered Fabric Cloth (such as an engineering fabric or polymeric mesh material, such as ITW Engineered Polymers Type Y-4"—Crack Repair Tape or Carlisle Coatings & Waterproofing Incorporated brand DCH Reinforcing Fabric cloth)

3.5. Solvent Cleaner (such as xylene solvent cleaner)

In one embodiment, layers can be as follows: first 3.3, then 3.2 (preferably not cryogen), then preferably two layers engineered fabric cloth 3.4 with 3.1, then 3.5.

Recommended Installation Sequencing 4.1. Measure, locate and mark for joint line allowing an area of a minimum 3" of width over centerline of this joint. If crack varies in width or spread, surface shall be prepared 1½" past crack on furthest extent, each side.

4.2. Mechanically abrade full vertical and horizontal surface of liner for the minimum 3" wide strip.

4.3. Vacuum, wipe and clean prepared surface to remove dust, dirt, debris.

4.4. If joint or crack is more than ½" wide install backer rod into opening to a depth of ½" of the width.

4.5. Install Polyurethane sealant into the joint flush to the InsulPOX liner outermost face surface.

4.6. Mix in accordance with manufacturer's data sheet.

4.7. Apply basecoat of Cryobond 837 at 20 mils, embed minimum 3" wide engineered fabric into basecoat and saturate, preferably by applying more of Cryobond 837.

4.8. Apply topcoat of Cryobond 837 at 20 mils thickness over the basecoat.

4.9. After curing, the joint system repair is now complete.

The outside of the concrete sections 11 can be sealed with a watertight system, such as Emshield WFR2 System, EMSHIELD® sold by EmShield Joint Systems.

The following is a list of parts and materials suitable for use in the present invention:

PARTS LIST:

| PART NUMBER | DESCRIPTION |
|---|---|
| 10 | trench apparatus/LNG trench |
| 11 | section/straight trough section |
| 12 | bottom wall |
| 13 | side wall |
| 14 | side wall |
| 15 | end portion |
| 16 | end portion |
| 17 | connection/interlocking connection |
| 18 | adhesive/bonder paste |
| 19 | tool/trowel |
| 20 | bottom panel |
| 21 | side panel |
| 22 | side panel |
| 23 | mold |
| 24 | frame |
| 25 | leg |
| 26 | peripheral frame/beams/rectangular periphery |
| 27 | cavity |
| 28 | insulating polymer concrete material/cryogenic grade insulating material |
| 30 | section |
| 31 | section |
| 32 | section |
| 33 | corner trough section/bend |
| 34 | corner trough section/bend |
| 35 | corner trough section/bend |
| 36 | trough riser section/wall riser section |
| 37 | trough lap joint |
| 38 | trough expansion joint |
| 39 | bellow |
| 40 | recess |
| 41 | water-tight fire-resistant seal |
| 42 | riser to trough connection detail |
| 44 | anchor bolt |
| 45 | opening/tie down hole |
| 46 | end trough section |
| 47 | rod/pin/fastener |
| 48 | void space/recess/cavity |
| 49 | curved section |
| 50 | flange |
| 51 | anchor/anchor bolt |
| 52 | tab |
| 53 | gap |
| 54 | bellow joint |
| 55 | bellow joint |
| 55A | bellow joint |
| 56 | bellow |
| 57 | curved section |
| 58 | flange |
| 59 | angle beam |
| 60 | void space |
| 61 | gap |
| 62 | seal |
| 63 | galvanized tubing/tubing section |
| 64 | anchor bolt |
| 65 | bolt/anchor bolt |
| 66 | non-sag filler |
| 67 | nosing |
| 68 | tongue and groove connection |
| 69 | gap |
| 70 | non-sag sealer/sealing material |
| 71 | non-sag sealer/sealing material |
| 72 | vertical channel/opening |
| 73 | cover plate |
| 74 | arrow |
| 75 | angle plate/tab |
| 76 | non-sag filler |
| 77 | fastener |
| 78 | bolt |
| 79 | gap |
| 80 | gap/joint |
| 81 | mesh/woven material/tape |

-continued

PARTS LIST:

| PART NUMBER | DESCRIPTION |
|---|---|
| 82 | non-sag sealer/sealant |
| 83 | non-sag joint sealant |
| 88 | connecting portion |
| 98 | void space/recess/cavity |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of installing a trench for containing a cryogenic spill, comprising the steps of:
    a) constructing multiple precast concrete sections, each section having a bottom wall and spaced apart side walls connected to and extending up from said bottom wall;
    b) wherein in step "a" each section has end portions that enable connection to another said concrete section;
    c) providing multiple panels of polymeric concrete cryogen insulating material;
    d) adhering said panels of step "c" to the bottom wall and side walls of each said concrete section;
    e) forming connections of one said panel of step "c" to another said panel of step "c" by connecting the concrete sections together wherein one end portion of one said panel connects to another end portion of another said panel;
    f) the connections of step "e" include applying an epoxy or elastomeric grout to the panel end portions; and
    g) wherein the connections of steps "e" and "f" include a bellow structure.

2. The method of claim 1 wherein each panel is between about one half and three inches thick.

3. The method of claim 1 wherein each panel has a generally rectangular periphery.

4. The method of claim 1 wherein the polymeric concrete cryogenic insulating material includes an epoxy.

5. The method of claim 1 wherein at least one of the side walls has a side wall height and wherein in step "d" the panels extend vertically only part of said side wall height.

6. The method of claim 1 wherein the precast concrete sections have openings through the bottom wall at one or both of said end portions.

7. The method of claim 6 wherein anchor bolts extend through the openings into a foundation.

8. The method of claim 7 wherein the foundation is concrete.

9. The method of claim 1 wherein the panels and the connections create continuous cryogenic insulating material throughout the connected concrete sections.

10. A method of installing a trench for containing a cryogenic spill, comprising the steps of:
    a) constructing multiple precast concrete sections, each section having a bottom wall and spaced apart side walls connected to and extending up from said bottom wall;
    b) wherein in step "a" each section has end portions that enable connection to another said concrete section;

c) providing multiple panels of polymeric concrete cryogen insulating material;
d) adhering one or more of said panels of step "c" to the bottom wall and side walls of each said concrete section;
e) connecting the concrete sections together by abutting one said end portion to another said end portion with a gap between said abutting end portions;
f) wherein the connection of step "e" includes applying a non-sag filler to the said end portions at said gap; and
g) wherein the connections include an engineering cloth layered with said filler.

11. The method of claim 10 wherein the non-sag filler includes a butyl rubber elastomer.

12. The method of claim 11, wherein the non-sag filler includes one or more layers of the butyl rubber elastomer and the engineering cloth.

13. The method of claim 10, wherein the connection of the panels and the non-sag filler create continuous cryogenic insulating material throughout the connected concrete sections.

14. The method of claim 10 wherein the polymeric concrete material is a cryogenic insulating material.

15. A method of installing a trench for containing a cryogenic spill, comprising the steps of:
    a) constructing multiple precast concrete sections, each section having a bottom wall and spaced apart side walls connected to and extending up from said bottom wall;
    b) wherein in step "a" each section has end portions that enable connection to another said concrete section;
    c) providing multiple panels of polymeric concrete cryogen insulating material;
    d) adhering one or more of said panels of step "c" to the bottom wall and side walls of each said concrete section;
    e) connecting the concrete sections together using connections of one end portion to another end portion;
    f) wherein in step "e" the connection includes spacing the said end portions apart to form a gap and filling the gap with a cryogen barrier seal material;
    g) wherein the cryogen barrier seal material includes a butyl rubber elastomer; and
    h) the said multiple panels of cryogen insulating material and seal of steps "f" and "g" define a continuous cryogen barrier that extends from one said concrete section to another said concrete section or other said concrete sections, said continuous cryogen barrier extending to the bottom wall and both side walls of said concrete barrier.

16. The method of claim 15, wherein the seal includes one or more layers of said butyl rubber elastomer and engineering cloth.

17. The method of claim 15 wherein the spacing of step "f" is between about ½ and 3 inches.

18. The method of claim 15 wherein the polymeric concrete material is a cryogenic insulating material.

19. The method of claim 15 wherein at least one of the side walls has a side wall height and wherein in step "d" the panels extend vertically only part of said side wall height.

* * * * *